(12) United States Patent
Gao et al.

(10) Patent No.: US 11,582,329 B2
(45) Date of Patent: *Feb. 14, 2023

(54) SYSTEM AND METHOD FOR IMPROVING EFFICIENCY OF A REMOTE COMPUTING DEVICE

(71) Applicant: Click Therapeutics, Inc., New York, NY (US)

(72) Inventors: Victor Gao, New York, NY (US); David Klein, New York, NY (US)

(73) Assignee: Click Therapeutics, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,916

(22) Filed: Mar. 11, 2022

(65) Prior Publication Data

US 2022/0201098 A1 Jun. 23, 2022

Related U.S. Application Data

(63) Continuation of application No. 17/129,751, filed on Dec. 21, 2020, now Pat. No. 11,277,493, which is a continuation of application No. 16/687,050, filed on Nov. 18, 2019, now Pat. No. 10,873,649, which is a continuation of application No. 16/544,575, filed on Aug. 19, 2019, now Pat. No. 10,484,502, which is a continuation of application No. 15/348,777, filed on Nov. 10, 2016, now Pat. No. 10,389,846.

(60) Provisional application No. 62/253,470, filed on Nov. 10, 2015.

(51) Int. Cl.
*H04L 67/62* (2022.01)
*H04L 67/125* (2022.01)
*H04L 67/303* (2022.01)

(52) U.S. Cl.
CPC ........... *H04L 67/62* (2022.05); *H04L 67/125* (2013.01); *H04L 67/303* (2013.01)

(58) Field of Classification Search
CPC ...... H04L 67/62; H04L 67/125; H04L 67/303
USPC .......................................................... 709/203
See application file for complete search history.

(56) References Cited

U.S. PATENT DOCUMENTS

| | | |
|---|---|---|
| 6,161,095 A | 12/2000 | Brown |
| 7,941,326 B2 | 5/2011 | Brown |
| 8,041,749 B2 | 10/2011 | Beck |
| 8,529,409 B1 | 9/2013 | Lesea-Ames |
| 8,870,762 B2 | 10/2014 | Brown |
| 2003/0212579 A1 | 11/2003 | Brown et al. |

(Continued)

FOREIGN PATENT DOCUMENTS

WO WO-2013/163730 A1 11/2013

OTHER PUBLICATIONS

Final Office Action on U.S. Appl. No. 15/563,477 dated May 1, 2020.

(Continued)

*Primary Examiner* — Hermon Asres
(74) *Attorney, Agent, or Firm* — Foley & Lardner LLP

(57) ABSTRACT

The present disclosure discusses system and methods for improving the efficiency of a remote computing device. The system and methods include generate a profile and delivery schedule for the remote computing device. The system can dynamically update the delivery schedule of future requests the system transmits to the remote computing device based on responses to current request.

20 Claims, 15 Drawing Sheets

(56) References Cited

U.S. PATENT DOCUMENTS

| | | | |
|---|---|---|---|
| 2010/0211407 A1 | 8/2010 | Duke et al. | |
| 2010/0222845 A1* | 9/2010 | Goetz | G16H 70/00 607/59 |
| 2011/0288887 A1 | 11/2011 | Duke et al. | |
| 2013/0091452 A1 | 4/2013 | Sorden et al. | |
| 2013/0149683 A1* | 6/2013 | Steerman | G09B 19/00 434/236 |
| 2014/0089001 A1* | 3/2014 | Macoviak | G16H 20/10 705/2 |
| 2014/0207048 A1 | 7/2014 | Dipierro et al. | |
| 2015/0064672 A1* | 3/2015 | Bars | G01N 33/4972 434/236 |

OTHER PUBLICATIONS

International Search Report and Written Opinion dated Jun. 29, 2016 in PCT Application No. PCT/US2016/025860.

Non-Final Office Action on U.S. Appl. No. 15/348,777 dated Jan. 25, 2019.

Non-Final Office Action on U.S. Appl. No. 15/563,477 dated Sep. 26, 2019.

Notice of Allowance on U.S. Appl. No. 15/348,777 dated May 1, 2019.

Notice of Allowance on U.S. Appl. No. 16/544,575 dated Oct. 10, 2019.

Notice of Allowance on U.S. Appl. No. 16/544,603 dated Oct. 3, 2019.

Notice of Allowance on U.S. Appl. No. 16/687,022 dated Feb. 18, 2020.

Notice of Allowance on U.S. Appl. No. 16/687,050 dated Aug. 21, 2020.

U.S. Notice of Allowance on U.S. Appl. No. 17/129,751 dated Nov. 2, 2021.

* cited by examiner

SYSTEM AND METHOD FOR IMPROVING EFFICIENCY OF A REMOTE COMPUTING DEVICE

CROSS-REFERENCE TO RELATED APPLICATIONS

The present application claims priority under 35 U.S.C. § 120 as a continuation of U.S. patent application Ser. No. 17/129,751, filed on Dec. 21, 2020, which claims priority under 35 U.S.C. § 120 as a continuation of U.S. patent application Ser. No. 16/687,050, filed on Nov. 18, 2019, which claims priority under 35 U.S.C. § 120 as a continuation of U.S. patent application Ser. No. 16/544,575, filed on Aug. 19, 2019, which claims priority under 35 U.S.C. § 120 as a continuation of U.S. patent application Ser. No. 15/348,777, filed on Nov. 10, 2016, which claims priority under 35 U.S.C. § 119(e) to and the benefit of U.S. Provisional Patent Application No. 62/253,470 filed on Nov. 10, 2015, each of which is herein incorporated by reference in its entirety for all purposes.

BACKGROUND

Remote computing devices can have limited computational and limited power resources. A control server may request information from the remote computing device at predetermined intervals. The remote computing device's generation of responses to those requests from the server can strain the limited resources of the remote computing device. The responses to the server can be generated irrespective of changes in the environment of the remote computing device.

BRIEF SUMMARY

According to one aspect of the disclosure, a method includes generating, by a server that includes one or more processors, a profile associated with an application that is executing on a remote computing device. The method can also include determining, by the server, a first time at which to transmit a first request for application activity update of the application. The first determined time can be based on feedback received from the application. The method can also include transmitting, by the server, at the first time, the first request for an application activity update. The first request can include instructions to provide a trigger on the remote computing device. The method can also include receiving, by the server from the remote computing device and responsive to an activation of the trigger on the remote computing device, a response. The response can include the application activity update. The method can also include determining, by the server, a second time at which to transmit a second request for application activity update. The second determined time can be based on content included in the response from the remote computing device. The method can also include transmitting, by the server, at the second time, the second request for the application activity update from the application.

In some implementations, the method can include launching, responsive to the activation of the trigger, the application on the remote computing device. The method can also include launching the application on the remote computing device responsive to a predetermined action performed on the trigger.

The method can also include maintaining in a memory element, by the server, for the profile, a log including the content of the response. The method can also include updating, by the server, the memory element to include content of a second response to the second request in the log for the profile.

In some implementations, the method can include determining, by the server, based on the profile associated with the application, a delivery time schedule that can include the first determined time at which to transmit the first request for application activity update of the application and the second determined time at which to transmit the second request for application activity update of the application. The method can also include updating, by the server, the second time responsive to the response that can include the application activity update.

The content can include at least one of a location of a remote computing device identifier, a battery level of the remote computing device, a delay time that indicates the time between the receipt of the request and the activation of the trigger, a completion time that indicates a transmission time of the response, or an activation time of the trigger.

The method can also include determining the first time based on the profile associated with the application executing on the remote computing device. The second request for application activity update can include a second trigger. The method can include selecting, by the server, a second application launched responsive to the second trigger. The second application can be different than an application launched responsive to the activation of the trigger.

According to another aspect of the disclosure, a system can include one or more processors coupled with a memory storing processor executable instructions. Execution of the processor executable instructions by the one or more processors cause the one or more processors to generate a profile associated with an application that is executing on a remote computing device. The system can also determine, based on feedback received from the application, a first time at which to transmit a first request for application activity update of the application. The system can also transmit at the first time, the first request for the application activity update. The first request can include instructions to provide a trigger on the remote computing device. The system can also receive from the remote computing device, and responsive to an activation of the trigger on the remote computing device, a response that can include the application activity update. The system can also determine, based on content included in the response from the remote computing device, a second time at which to transmit a second request for application activity update. The system can transmit at the second time, the second request for the application activity update from the application.

In some implementations, the system can also launch, responsive to the activation of the trigger, the application on the remote computing device. The system can launch the application on the remote computing device responsive to a predetermined action performed on the trigger.

In some implementations, the system can maintain, in a memory element, for the profile, a log that can include the content of the response. The system can also update the memory element to include content of a second response to the second request in the log for the profile.

The system can also determine, based on the profile associated with the application, a delivery time schedule comprising the first time at which to transmit the first request for application activity update of the application and the second time at which to transmit the second request for application activity update of the application. The system can also update the second time responsive to the response including the application activity update.

In some implementations, the content can include at least one of a location of a remote computing device identifier, a battery level of the remote computing device, a delay time between receipt of the request and the activation of the trigger, a completion time comprising a transmission time of the response, or an activation time.

The system can determine the first time based on the profile associated with the application executing on the remote computing device. The second request for application activity update can include a second trigger. The system can select a second application launched responsive to the second trigger. The second application is different than an application launched responsive to the activation of the trigger.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
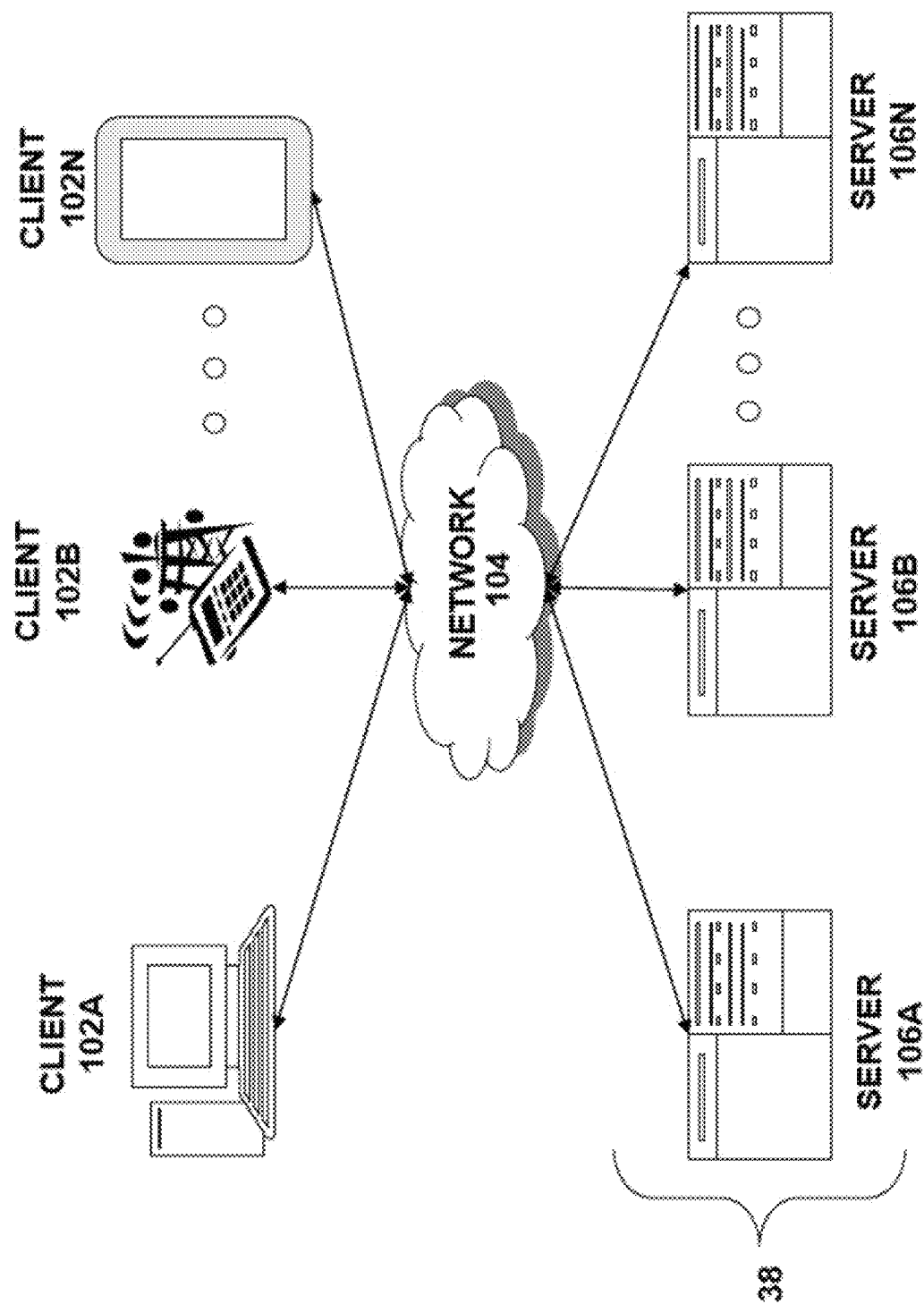
FIG. 1A is a block diagram depicting an embodiment of a network environment comprising local devices in communication with remote devices.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following enumeration of the sections of the specification and their respective contents may be helpful:

Section A describes a network and computing environment which may be useful for practicing embodiments described herein;

Section B describes embodiments of systems and methods for improving an efficiency of a remote computing device.

A. Network and Computing Environment

In addition to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 1102a-1102n (also generally referred to as local machine(s) 1102, client(s) 1102, client node(s) 1102, client machine(s) 1102, client computer(s) 1102, client device(s) 1102, endpoint(s) 1102, or endpoint node(s) 1102) in communication with one or more servers 1106a-1106n (also generally referred to as server(s) 1106, node 1106, or remote machine(s) 1106) via one or more networks 1104. In some embodiments, a client 1102 has the capacity to function as both a client node seeking access to resources provided by a server and as a server providing access to hosted resources for other clients 1102a-1102n.

Although FIG. 1A shows a network 1104 between the clients 1102 and the servers 1106, the clients 1102 and the servers 1106 may be on the same network 1104. In some embodiments, there are multiple networks 1104 between the clients 1102 and the servers 1106. In one of these embodiments, a network 1104' (not shown) may be a private network and a network 1104 may be a public network. In another of these embodiments, a network 1104 may be a private network and a network 1104' a public network. In still another of these embodiments, networks 1104 and 1104' may both be private networks.

The network 1104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 1104 may be any type and/or form of network. The geographical scope of the network 1104 may vary widely and the network 1104 can be a body area network (BAN), a personal area network (PAN), a local-area network (LAN), e.g. Intranet, a metropolitan area network (MAN), a wide area network (WAN), or the Internet. The topology of the network 1104 may be of any form and may include, e.g., any of the following: point-to-point, bus, star, ring, mesh, or tree. The network 1104 may be an overlay network which is virtual and sits on top of one or more layers of other networks 1104'. The network 1104 may be of any such network topology as known to those ordinarily skilled in the art capable of supporting the operations described herein. The network 1104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 1104 may be a type of a broadcast network, a telecommunications network, a data communication network, or a computer network.

In some embodiments, the system may include multiple, logically-grouped servers 1106. In one of these embodiments, the logical group of servers may be referred to as a server farm 38 or a machine farm 38. In another of these embodiments, the servers 1106 may be geographically dispersed. In other embodiments, a machine farm 38 may be administered as a single entity. In still other embodiments, the machine farm 38 includes a plurality of machine farms 38. The servers 1106 within each machine farm 38 can be heterogeneous—one or more of the servers 1106 or machines 1106 can operate according to one type of operating system platform (e.g., WINDOWS NT, manufactured by Microsoft Corp. of Redmond, Wash.), while one or more of the other servers 1106 can operate on according to another type of operating system platform (e.g., Unix, Linux, or Mac OS X).

In one embodiment, servers 1106 in the machine farm 38 may be stored in high-density rack systems, along with associated storage systems, and located in an enterprise data center. In this embodiment, consolidating the servers 1106 in this way may improve system manageability, data security, the physical security of the system, and system performance by locating servers 1106 and high performance storage systems on localized high performance networks. Centralizing the servers 1106 and storage systems and coupling them with advanced system management tools allows more efficient use of server resources.

The servers 1106 of each machine farm 38 do not need to be physically proximate to another server 1106 in the same machine farm 38. Thus, the group of servers 1106 logically grouped as a machine farm 38 may be interconnected using a wide-area network (WAN) connection or a metropolitan-area network (MAN) connection. For example, a machine farm 38 may include servers 1106 physically located in different continents or different regions of a continent, country, state, city, campus, or room. Data transmission speeds between servers 1106 in the machine farm 38 can be increased if the servers 1106 are connected using a local-area network (LAN) connection or some form of direct connection. Additionally, a heterogeneous machine farm 38 may include one or more servers 1106 operating according to a type of operating system, while one or more other servers 1106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 1106 may comprise components, subsystems and modules to support one or more management services for the machine farm 38. In one of these embodiments, one or more servers 1106 provide functionality for management of dynamic data, including techniques for handling failover, data replication, and increasing the robustness of the machine farm 38. Each server 1106 may communicate with a persistent store and, in some embodiments, with a dynamic store.

Server 1106 may be a file server, application server, web server, proxy server, appliance, network appliance, gateway, gateway server, virtualization server, deployment server, SSL VPN server, or firewall. In one embodiment, the server 1106 may be referred to as a remote machine or a node. In another embodiment, a plurality of nodes 290 may be in the path between any two communicating servers.

Figure 1B:
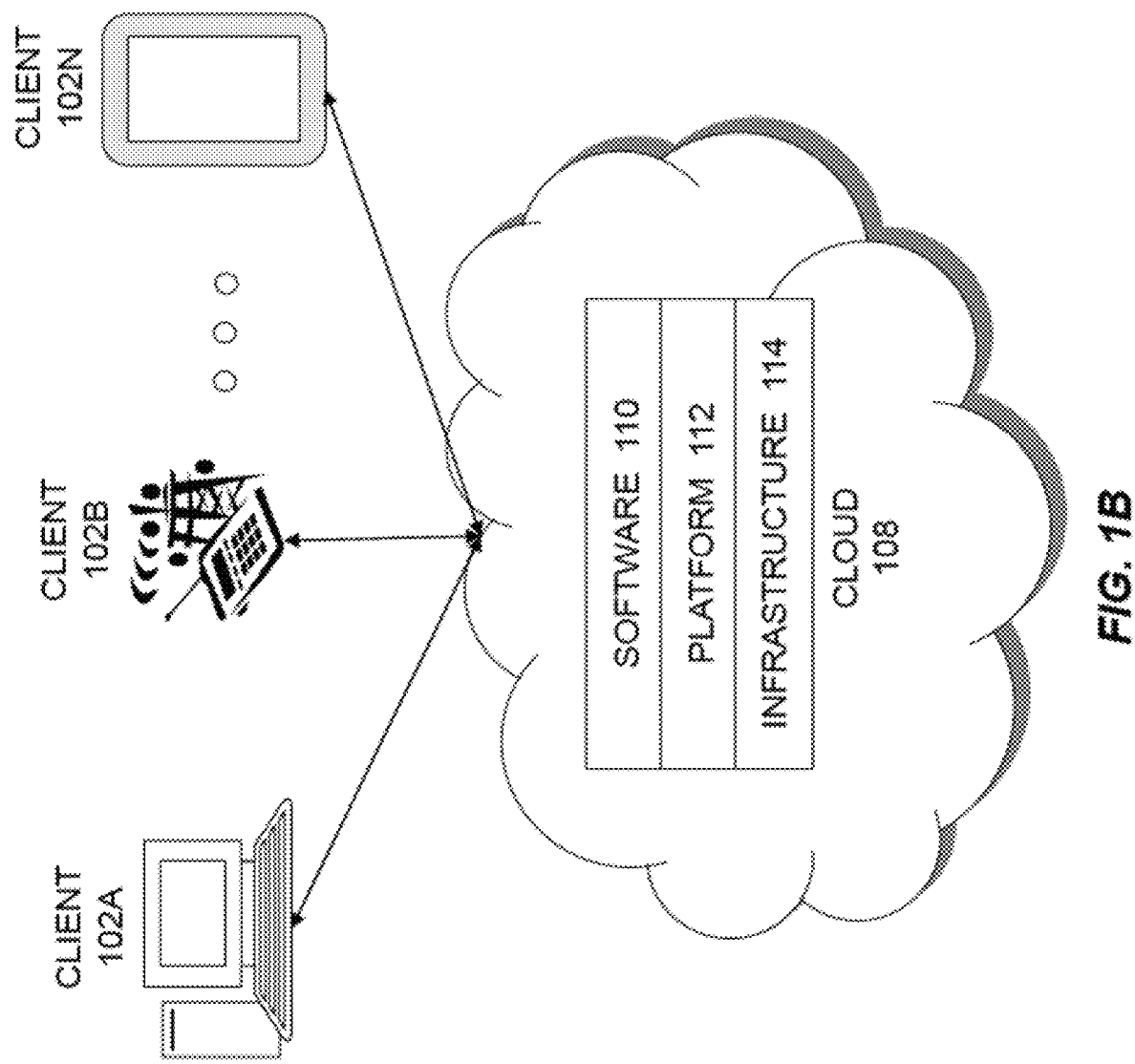
FIGS. 1B-1D are block diagrams depicting embodiments of computers useful in connection with the methods and systems described herein.

Referring to FIG. 1B, a cloud computing environment is depicted. A cloud computing environment may provide client 1102 with one or more resources provided by a network environment. The cloud computing environment may include one or more clients 1102a-1102n, in communication with the cloud 1108 over one or more networks 1104. Clients 1102 may include, e.g., thick clients, thin clients, and zero clients. A thick client may provide at least some functionality even when disconnected from the cloud 1108 or servers 1106. A thin client or a zero client may depend on the connection to the cloud 1108 or server 1106 to provide functionality. A zero client may depend on the cloud 1108 or other networks 1104 or servers 1106 to retrieve operating system data for the client device. The cloud 1108 may include back end platforms, e.g., servers 1106, storage, server farms or data centers.

The cloud 1108 may be public, private, or hybrid. Public clouds may include public servers 1106 that are maintained by third parties to the clients 1102 or the owners of the clients. The servers 1106 may be located off-site in remote geographical locations as disclosed above or otherwise. Public clouds may be connected to the servers 1106 over a public network. Private clouds may include private servers 1106 that are physically maintained by clients 1102 or owners of clients. Private clouds may be connected to the servers 1106 over a private network 1104. Hybrid clouds 1108 may include both the private and public networks 1104 and servers 1106.

The cloud 1108 may also include a cloud based delivery, e.g. Software as a Service (SaaS) 1110, Platform as a Service (PaaS) 1112, and Infrastructure as a Service (IaaS) 1114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 1102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 1102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 1102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 1102 may also access SaaS resources through smartphone or tablet applications, including, for example, Salesforce Sales Cloud, or Google Drive app. Clients 1102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
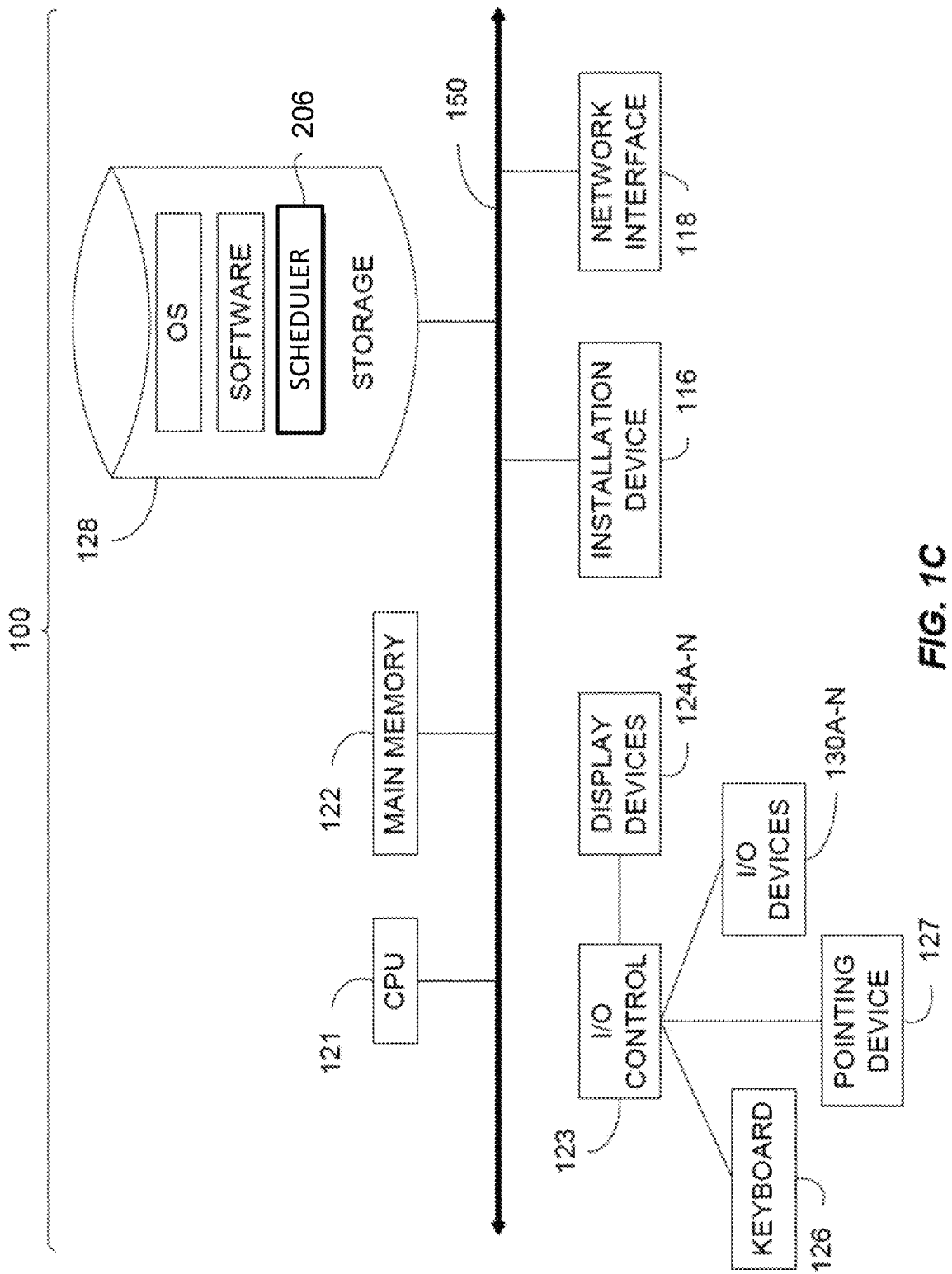
Figure 1D:
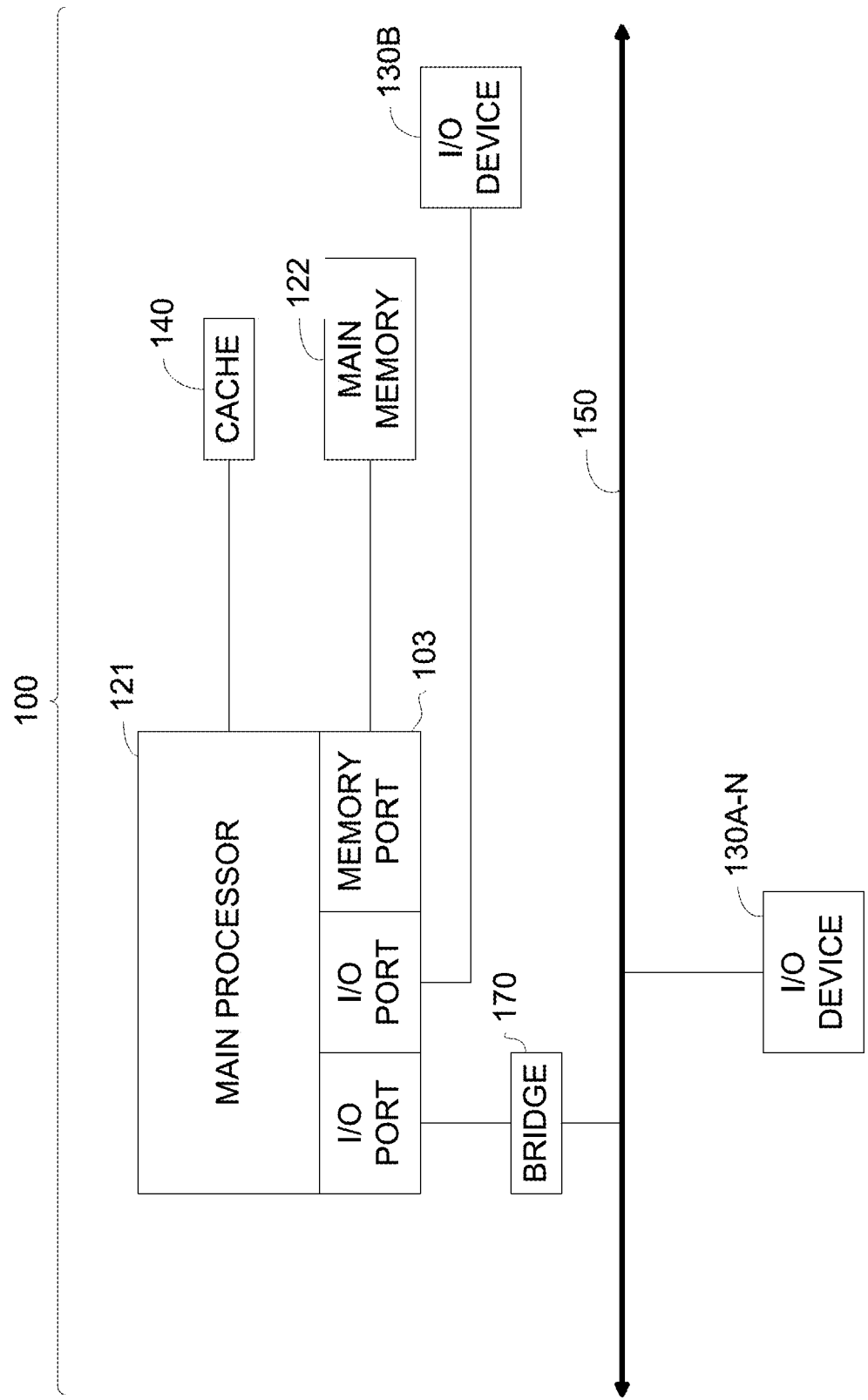

The client 1102 and server 1106 may be deployed as and/or executed on any type and form of computing device, e.g. a computer, network device or appliance capable of communicating on any type and form of network and performing the operations described herein. FIGS. 1C and 1D depict block diagrams of a computing device 1100 useful for practicing an embodiment of the client 1102 or a server 1106. As shown in FIGS. 1C and 1D, each computing device 1100 includes a central processing unit 1121, and a main memory unit 1122. As shown in FIG. 1C, a computing device 1100 may include a storage device 1128, an installation device 1116, a network interface 1118, an I/O controller 1123, display devices 1124a-1124n, a keyboard 1126 and a pointing device 1127, e.g. a mouse. The storage device 1128 may include, without limitation, an operating system, software, and a software of a behavioral change platform (BCM) 1120. As shown in FIG. 1D, each computing device 1100 may also include additional optional elements, e.g. a memory port 1103, a bridge 1170, one or more input/output devices 1130a-1130n (generally referred to using reference numeral 1130), and a cache memory 1140 in communication with the central processing unit 1121.

The central processing unit 1121 is any logic circuitry that responds to and processes instructions fetched from the main memory unit 1122. In many embodiments, the central processing unit 1121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 1100 may be based on any of these processors, or any other processor capable of operating as described herein. The central processing unit 1121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 1122 may include one or more memory chips capable of storing data and allowing any storage location to be directly accessed by the microprocessor 1121. Main memory unit 1122 may be volatile and faster than storage 1128 memory. Main memory units 1122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 1122 or the storage 1128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 1122 may be based on any of the above described memory chips, or any other available memory chips capable of operating as described herein. In the embodiment shown in FIG. 1C, the processor 1121 communicates with main memory 1122 via a system bus 1150 (described in more detail below). FIG. 1D depicts an embodiment of a computing device 1100 in which the processor communicates directly with main memory 1122 via a memory port 1103. For example, in FIG. 1D the main memory 1122 may be DRDRAM.

FIG. 1D depicts an embodiment in which the main processor 1121 communicates directly with cache memory 1140 via a secondary bus, sometimes referred to as a backside bus. In other embodiments, the main processor 1121 communicates with cache memory 1140 using the system bus 1150. Cache memory 1140 typically has a faster response time than main memory 1122 and is typically provided by SRAM, BSRAM, or EDRAM. In the embodiment shown in FIG. 1D, the processor 1121 communicates with various I/O devices 1130 via a local system bus 1150. Various buses may be used to connect the central processing unit 1121 to any of the I/O devices 1130, including a PCI bus, a PCI-X bus, or a PCI-Express bus, or a NuBus. For embodiments in which the I/O device is a video display 1124, the processor 1121 may use an Advanced Graphics Port (AGP) to communicate with the display 1124 or the I/O controller 1123 for the display 1124. FIG. 1D depicts an embodiment of a computer 1100 in which the main processor 1121 communicates directly with I/O device 1130b or other processors 1121' via HYPERTRANSPORT, RAPIDIO, or INFINIBAND communications technology. FIG. 1D also depicts an embodiment in which local busses and direct communication are mixed: the processor 1121 communicates with I/O device 1130a using a local interconnect bus while communicating with I/O device 1130b directly.

A wide variety of I/O devices 1130a-1130n may be present in the computing device 1100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 1130a-1130n may include a combination of multiple input or output devices, including, e.g., Microsoft KINECT, Nintendo Wiimote for the WIT, Nintendo WII U GAMEPAD, or Apple IPHONE. Some devices 1130a-1130n allow gesture recognition inputs through combining some of the inputs and outputs. Some devices 1130a-1130n provides for facial recognition which may be utilized as an input for different purposes including authentication and other commands. Some devices 1130a-1130n provides for voice recognition and inputs, including, e.g., Microsoft KINECT, SIRI for IPHONE by Apple, Google Now or Google Voice Search.

Additional devices 1130a-1130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, may have larger surfaces, such as on a table-top or on a wall, and may also interact with other electronic devices. Some I/O devices 1130a-1130n, display devices 1124a-1124n or group of devices may be augment reality devices. The I/O devices may be controlled by an I/O controller 1123 as shown in FIG. 1C. The I/O controller may control one or more I/O devices, such as, e.g., a keyboard 1126 and a pointing device 1127, e.g., a mouse or optical pen. Furthermore, an I/O device may also provide storage and/or an installation medium 1116 for the computing device 1100. In still other embodiments, the computing device 1100 may provide USB connections (not shown) to receive handheld USB storage devices. In further embodiments, an I/O device 1130 may be a bridge between the system bus 1150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 1124a-1124n may be connected to I/O controller 1123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 1124a-1124n may also be a head-mounted display (HMD). In some embodiments, display devices 1124a-1124n or the corresponding I/O controllers 1123 may be controlled through or have hardware support for OPENGL or DIRECTX API or other graphics libraries.

In some embodiments, the computing device 1100 may include or connect to multiple display devices 1124a-1124n, which each may be of the same or different type and/or form. As such, any of the I/O devices 1130a-1130n and/or the I/O controller 1123 may include any type and/or form of suitable hardware, software, or combination of hardware and software to support, enable or provide for the connection and use of multiple display devices 1124a-1124n by the computing device 1100. For example, the computing device 1100 may include any type and/or form of video adapter, video card, driver, and/or library to interface, communicate, connect or otherwise use the display devices 1124a-1124n. In one embodiment, a video adapter may include multiple connectors to interface to multiple display devices 1124a-1124n. In other embodiments, the computing device 1100 may include multiple video adapters, with each video adapter connected to one or more of the display devices 1124a-1124n. In some embodiments, any portion of the operating system of the computing device 1100 may be configured for using multiple displays 1124a-1124n. In other embodiments, one or more of the display devices 1124a-1124n may be provided by one or more other computing devices 1100a or 1100b connected to the computing device 1100, via the network 1104. In some embodiments software may be designed and constructed to use another computer's display device as a second display device 1124a for the computing device 1100. For example, in one embodiment, an Apple iPad may connect to a computing device 1100 and use the display of the device 1100 as an additional display screen that may be used as an extended desktop. One ordinarily skilled in the art will recognize and appreciate the various ways and embodiments that a computing device 1100 may be configured to have multiple display devices 1124a-1124n.

Referring again to FIG. 1C, the computing device 1100 may comprise a storage device 1128 (e.g. one or more hard disk drives or redundant arrays of independent disks) for storing an operating system or other related software, and for storing application software programs such as any program related to the software for the delivery scheduler 206. Examples of storage device 1128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 1128 may be non-volatile, mutable, or read-only. Some storage device 1128 may be internal and connect to the computing device 1100 via a bus 1150. Some storage device

1128 may be external and connect to the computing device 1100 via an I/O device 1130 that provides an external bus. Some storage device 1128 may connect to the computing device 1100 via the network interface 1118 over a network 1104, including, e.g., the Remote Disk for MACBOOK AIR by Apple. Some client devices 1100 may not require a non-volatile storage device 1128 and may be thin clients or zero clients 1102. Some storage device 1128 may also be used as an installation device 1116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 1100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 1102. An application distribution platform may include a repository of applications on a server 1106 or a cloud 1108, which the clients 1102*a*-1102*n* may access over a network 1104. An application distribution platform may include application developed and provided by various developers. A user of a client device 1102 may select, purchase and/or download an application via the application distribution platform.

Furthermore, the computing device 1100 may include a network interface 1118 to interface to the network 1104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 1100 communicates with other computing devices 1100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 1118 may comprise a built-in network adapter, network interface card, PCMCIA network card, EXPRESSCARD network card, card bus network adapter, wireless network adapter, USB network adapter, modem or any other device suitable for interfacing the computing device 1100 to any type of network capable of communication and performing the operations described herein.

A computing device 1100 of the sort depicted in FIGS. 1B and 1C may operate under the control of an operating system, which controls scheduling of tasks and access to system resources. The computing device 1100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 1100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 1100 has sufficient processor power and memory capacity to perform the operations described herein. In some embodiments, the computing device 1100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 1100 is a gaming system. For example, the computer system 1100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 1100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 1100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 1100 is a tablet e.g. the IPAD line of devices by Apple; GALAXY TAB family of devices by Samsung; or KINDLE FIRE, by Amazon.com, Inc. of Seattle, Wash. In other embodiments, the computing device 1100 is an eBook reader, e.g. the KINDLE family of devices by Amazon.com, or NOOK family of devices by Barnes & Noble, Inc. of New York City, N.Y.

In some embodiments, the communications device 1102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 1102 is a laptop or desktop computer equipped with a web browser and a microphone and speaker system, e.g. a telephony headset. In these embodiments, the communications devices 1102 are web-enabled and can receive and initiate phone calls. In some embodiments, a laptop or desktop computer is also equipped with a webcam or other video capture device that enables video chat and video call.

In some embodiments, the status of one or more machines 1102, 1106 in the network 1104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Improving an Efficiency of a Remote Computing Device

Remote computing devices, also referred to as remote devices or client devices have finite computational resources and power resources. This is especially true for portable computing devices or computing devices that are not continuously receiving power from a power source. Moreover, computing devices may have limited computation resources, including processing capabilities, memory resources as well as data caps on how much data the computing device can transmit and receive over a communications network. Some computing devices, such has smartphones, tablets, among others may be configured to execute multiple applications on the same device and therefore, allocate the computing device's computing resources across the multiple applications. An application that consumes a lot of computing resources of the computing device can adversely affect the performance of the computing device as well as hog resources from other applications, thereby adversely affecting the performance of other applications on the computing device.

Application developers have to pay close attention when designing and developing their application to the computer resources required to execute their application. Some of the parameters that application developers need to keep in mind are the size of the application (the amount of memory required to store the application), the computing resources of the computing device the application needs, the frequency at which the computing resources are needed, the amount of power those computer resources will consume to allow the application to function properly, the amount of data received from a server communicating with the application and the amount of data transmitted by the application to the server, among others.

In some implementations, systems that provide remote monitoring via remote computing devices face similar challenges. The remote computing devices can be located in areas where the remote computing devices do not have access to a continuous power supply, have data caps, or the bandwidth over which these computing devices are quite small that sending large amounts of data can adversely affect the performance of the both the system and the computing devices. Moreover, these remote computing devices may be designed to have very limited computing resources in an effort to reduce power consumption as well as the cost to produce or manufacture these remote computing devices.

In some implementations, the remote computing devices can be designed to provide data to a server configured to collect data from the remote computing devices. The system can send, to each of the remote computing devices, requests for activity data of the remote computing devices. Each time a remote computing device receives a request for activity update from the server, the remote computing device can collect current data and transmit back a response with the collected data. As such, each time the remote computing device receives a request for activity update, the remote computing device expends power and utilizes computing and network resources. In remote computing devices that operate using a battery not connected to a continuous power supply, the remote computing device has limited power and therefore, within a single charge of the battery, provide a finite number of responses to the server.

In some implementations, these remote computing devices can be used to sense environmental conditions around the remote computing devices and report back the sensed conditions to the server. Each time the remote computing devices receive a request and transmit back a response, the remote computing devices consume power. In implementations where these remote computing devices do not have access to continuous power, there can be a desire to reduce power consumption. Moreover, in some implementations, these remote computing devices may be placed in environments where the devices may not be retrievable and as such, may be discarded, disposed or rendered useless once the power stored in their battery is depleted. As such, there is a desire to prolong the battery life of the remote computing device, or stated in another way, keep the remote computing device accessible to the server for a longer period of time or improve the efficiency of the remote computing device.

The present solution provides systems and methods that can improve the efficiency of remote computing devices. Remote computing devices, also referred to as remote devices or client devices, can include a number of constraints. The constraints can include limitations to battery power and processor power. The present solution can generate a dynamic time schedule to control the transmission of messages to the remote computing devices. The dynamic time schedule can be generated responsive to a profile associated with the remote computing device. Based on responses from the remote computing device, the present solution can update the dynamic time schedule such that the messages are transmitted to the remote computing device less frequently or at more appropriate times.

The present solution can also improve the efficiency of the server. The generation of the messages described herein can consume computational power of the server. The generation of a large number of messages can generate significant computational strain on the server. The generation of the messages according to a predefined schedule (e.g., at the top of every hour) can also result in significant computational strain. Additional strain is also incurred as the server processes the returned responses to each of the messages. The present solution can improve the performance of the server by dynamically updating a message delivery schedule. By updating the schedule dynamically for each message recipient, the message generation may occur more evenly throughout the day rather than concentrated at specific intervals. Also, the present solution improves efficiency by not generating messages where the likelihood of a response from a remote device is below a predetermined threshold. By generating fewer messages, the server also saves computational power by not having to processes as many incoming responses.

Figure 2:
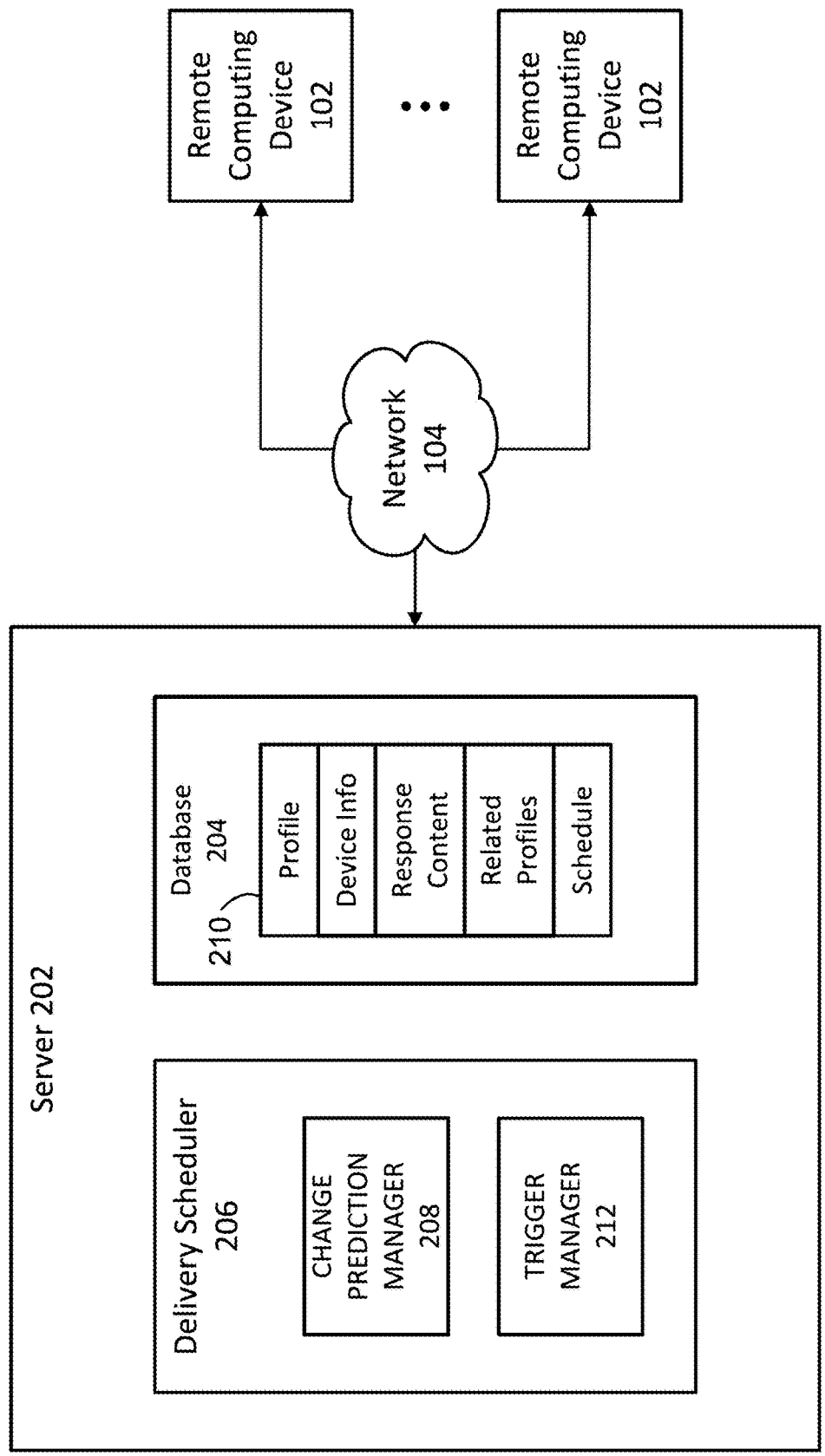
FIG. 2 illustrates a block diagram of a system for improving efficiency of a remote computing device.

FIG. 2 illustrates a block diagram of a system 200 for improving efficiency of a remote computing device. The system 200 includes a server 202 and a plurality of remote computing devices 102. The server 202 includes hardware and/or software and is configured to bring about the improved efficiency of the remote computing devices. The server includes a database 204 and a delivery scheduler 206. The delivery scheduler 206 includes a change prediction manager 208 and a trigger manager 212. The database 204 can include a profile entry 210 for each of the remote computing devices 102. The remote computing devices 102 are in communication with the server 202 via the network 104.

The remote computing devices 102 can be internet enabled remote devices. For example, the remote computing devices 102 can be internet of things ("IoT") devices. The IoT devices can include remote monitoring devices that include remote motion sensors, temperature sensors, soil condition sensors, or video cameras. In some implementations, the remote computing devices 102 can be mobile computing devices (or components thereof) such as cell phones, smart phones, laptops, and tablet computers. The remote computing devices 102 can have limited computational power. The remote computing devices 102 can also have a limited power supply, such as a battery. The remote computing devices 102 can be configured to be awoken, pinged, messaged or otherwise contacted at predetermined intervals to make measurements, perform activities, or provide responses to requests for information. In some implementations, the remote computing devices 102 can be configured to receive requests at regular, predetermined intervals. Receiving requests at the regular, predetermined intervals can reduce the efficiency of the remote computing devices 102 because receiving requests can require additional battery power and computational power when processing and/or generating the responses including sensor readings made when the remote computing device 102 receives the requests.

The change prediction manager 208 is configured to generate and dynamically update a delivery time schedule. The change prediction manager 208 can generate the delivery time schedule based on current and previous data provided by a remote computing device 102 and also based on data collected from a population of remote computing devices 102 (e.g., the other remote computing devices 102 in the system 100). The change prediction manager 208 can predict times to transmit requests for updates from the remote computing devices 102. The requests can be for an update of activity of an application executing on the remote computing devices 102. The request can include a trigger that causes the application on the remote computing device 102 to execute a predetermined routine such as making a temperature measurement or displaying a predetermined user interface on a display of the remote computing device 102. The determination of the times in the delivery time schedule can be both dynamic and adaptive. The change prediction manager 208 can dynamically predict times when transmitting an update request to a remote computing device 102 can increase efficiency of the remote computing device. For example, for a remote temperature sensor, the change prediction manager 208 can determine not to transmit update requests during times the change prediction manager 208 predicts the temperature will remain relatively constant and can select times for the transmission of update requests when the change prediction manager 208 predicts there will be relatively greater amounts of variability in the remote temperature. Over time, the change prediction manager 208 can adapt to the changing responses form the remote computing device 102. For example, and continuing the above example, even during times of relatively higher variability, as the change prediction manager 208 develops models of the temperature patterns, the change prediction manager 208 may reduce the frequency that update requests are transmitted to the remote computing device 102.

In generating the delivery schedule for a remote computing device 102, the delivery scheduler 206 can use data relating to the remote computing device 102 and can also use data from other remote computing devices 102 to calculate trend data of remote computing devices 102 performing the same or similar operations. For example, the change prediction manager 208 may measure and model the responses of other remote computing devices 102 to determine general trends in the responses that may aid in the prediction of times to send a message to a specific remote computing device 102.

The delivery scheduler 206 can also include the trigger manager 212. The trigger manager 212 can be any script, file, program, application, set of instructions, or computer-executable code, that is configured to select and configure the triggers that are provided to the remote computing devices 102 in requests from the server 202. The triggers can include instructions that are executed by the remote computing device 102 after the remote computing device 102 receives the request that includes the trigger. In some implementations, the remote computing device 102 can be in a sleep, inactive, low power, or non-active state before receipt of the request. Once the remote computing device 102 receives the request, the remote computing device 102 can execute an application or other subroutine as instructed by the trigger. The trigger can cause an application executing on the remote computing device 102 to generate a response to the request. The response can include an application activity update and other content. The content of the application activity update can include a remote computing device identifier, a battery level of the remote computing device, a delay time, a completion time, or an activation time. The delay time can be the amount of time between the remote computing device's receipt of the request and the time the trigger was executed. In an example where the remote computing device 102 is a smart phone displaying a message or other notification to a user, the delay time can be the amount of time between when the message is displayed to the user and an action is taken on the message. The completion time can be the time when the triggered application completes the triggered subroutine or a response is measured. The activation time can indicate the time that the application is activated. For example, for a remote temperature sensor, the activation time can include the time the temperature measurement begins. In an example where the remote computing device 102 is a smart phone displaying a message or other notification, the activation time can be the time the message if first displayed.

The server 202 can also include a database 204 that can store a profile 210 for each of the remote computing devices 102 of the system 200. The profile can be a table that includes entries for identification of a specific remote computing device 102 (e.g., a unique serial number), response content (e.g., the content of previously received responses to requests from the server 202), related profiles, and a schedule of delivery times as generated by the delivery scheduler 206. The related profile entry of the profile 210 can include pointers to or the identification of profiles related to the current entry. For example, for the profile of a remote monitoring device, the related profiles may be the profiles of the other devices located at the same location. For a smart phone, the related profiles may be the profiles of smart phones associated with the friends of the user corresponding to the current entry.

Figure 3:
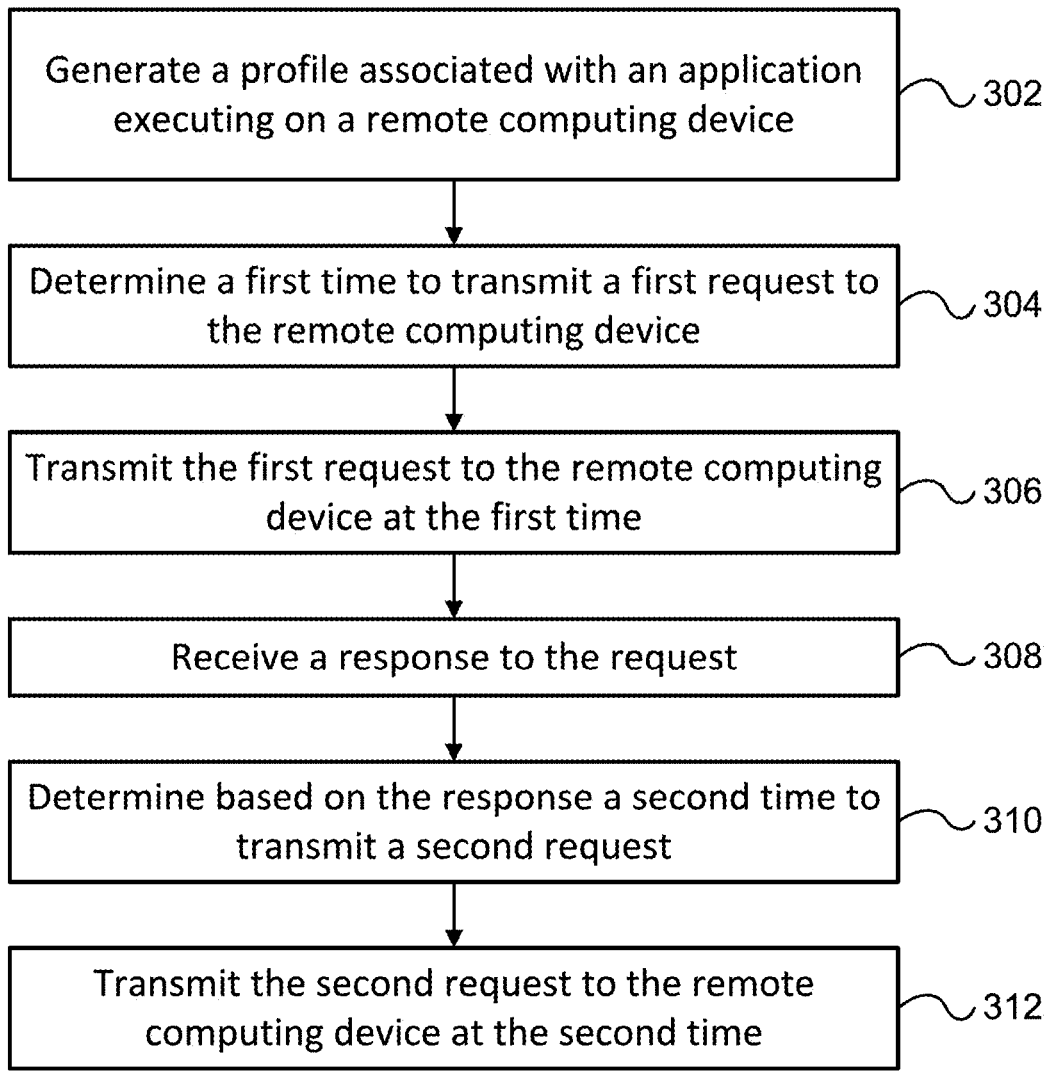
FIG. 3 illustrates a block diagram of an example method for improving the efficiency of a remote computing device.

FIG. 3 illustrates a block diagram of an example method 300 for improving the efficiency of a remote computing device. The method 300 can include generating, by a server including one or more processors, a profile associated with an application executing on a remote computing device (BLOCK 302). The method 300 can include determining a first time at which to transmit a first request for application activity update of the application (BLOCK 304). The method 300 can include transmitting, at the first time, the first request for application activity update (BLOCK 306). The method 300 can include receiving, from the remote computing device, a response including the application activity update (BLOCK 308). The method 300 can include determining, based on content included in the response from the remote computing device, a second time at which to transmit a second request to the remote computing device (BLOCK 310). The method 300 can include transmitting, at the second time, the second request to the remote computing device (BLOCK 312).

As set forth above, the method 300 can include generating a profile that is associated with an application executing on the remote computing device (BLOCK 302). The profile can be maintained in a database stored in a memory element of a server that is in electronic communication with the remote computing device. The profile can include device information about the remote computing device, such as the device's computational power and batter levels. The profile can include indications of profiles of related remote computing devices. The profile can also include a delivery time schedule. The delivery time schedule can include a plurality of times at which server transmits messages to the remote computing device. Initially, the delivery time schedule can include default times based on the device information and other information included in the profile. During the course of the method 300, the times of the delivery time schedule can be updated based on responses from the remote computing device.

The method 300 can also include determining a first time to transmit a request to the remote computing device (BLOCK 304). The server can determine the first time based on information or feedback provided by an application executing on the remote computing device. In some implementations, the first time can be based on the default or initial time of the delivery time schedule. For example, the remote computing device can be a remote temperature sensor. The server can determine a time to transmit a first request for an application activity update from the application executed on the remote temperature sensor. Based on the temperature sensor's profile, the delivery scheduler can determine that the temperature sensor is placed within an office building and can select a first time that is during business hours.

The method 300 can also include transmitting the first request to the remote computing device at the first time (BLOCK 306). The request can be a request for an application activity update. The request can include a trigger that can cause the remote computing device to open a predetermine application or routine. For example, for the temperature sensor, the trigger can cause a temperature sensor's application to start a routine that measures the environmental temperature and transmits the current temperature to the server.

The method 300 can also include receiving, from the remote computing device, a response to the request (BLOCK 308). The response can include content from the application executing on the remote computing device. The content can include the application activity update, which for a remote temperature sensor may be an updated temperature reading. The content can also include at least one of a location of the remote computing device identifier, a battery level of the remote computing device, a delay time, a completion time, or an activation time. The server can maintain the returned content in a log or profile associated with the remote computing device. The response can be generated by the application based on a predetermined action performed on the trigger. For example, the trigger can cause the generation of generation of a message on the screen of a remote computing device's screen. The predetermined action can include a user input made in response to the displayed message.

The method 300 can also include determining, based on the response, a second time to transmit a second request (BLOCK 310). In some implementations, determining the second time can include updating a subsequent time previously stored in the time delivery schedule that is associated with the remote computing device. As described above, the delivery scheduler can dynamically determine times for the transmission of requests or other messages to a remote computing device. The delivery scheduler can determine times to improve the efficiency of the remote computing device. Based on the received responses, the delivery scheduler can generate a model that predicts the content of future responses from the remote computing device. The delivery scheduler can use machine learning, neural networks, or regression models to predict the future responses from the remote computing device. In some implementations, the delivery scheduler can select times to send requests to the remote computing device based the variability level of the model. For example, for a remote temperature sensor, the delivery scheduler can select times when the temperature is more likely to fluctuate and less likely to select times when the environmental temperature is more likely to be constant.

The method 300 can also include transmitting a second request to the remote computing device at the second time (BLOCK 312). The second request can be a request for an application activity update. The second request can include a trigger that can cause the remote computing device to open a predetermine application or subroutine. For example, for the temperature sensor. The trigger can cause a temperature sensor's application to start a subroutine that measures the environmental temperature and transmits the current temperature to the server. In some implementations, the second request can provide a trigger different trigger than the type of trigger provided with the first request.

The present solution can be implemented in a system for health monitoring or drug delivery via connected remote medical computing devices that can monitor patient health and activity in a remote setting. The system can communicate with a portable computing device, such as a smartphone of a patient, which can be communicatively coupled to a plurality of sensors monitoring various health parameters of the patient. These sensors can include a heart rate sensor, a pedometer, a pulse oximetry sensor, a temperature sensor, motion sensor, and a body posture sensor for detecting a current position of the patient. In addition, the system can be communicatively coupled to a medicament delivery device configured to deliver a medicament to a patient. Each of the plurality of sensors may include batteries that may be replaceable or rechargeable. These sensors may be programmed to either collect measurements on a periodic basis or responsive to a request from the client device The portable computing device includes one or more processors, a memory element and an application stored in the memory element and configured to execute on the portable computing device. In one example of a health monitoring system, the smartphone of a patient can communicate with a plurality of sensors positioned around the patient's body or medical equipment. In this example system, the system can include one or more pulse oximeters, heart rate monitors, temperature sensors that monitor the vitals of the patient and actuators that control the activity of medical devices associated with the patient.

The server can generate an initial time delivery schedule that includes a plurality of times at which the server transmits messages to the patient's smart phone. As described above, the messages can include triggers. In this example, the triggers can launch applications or routines that cause the smartphone to poll the patient's sensors or control the medical devices. In some implementations, initially the triggers associated with each of the messages can include monitoring focused triggers. The monitoring focused triggers can cause the application to measure the status of patient via the sensors. For example, the monitoring focused triggers can cause the smartphone to launch an application that measures, via the sensors, the patient's temperature, blood oxygenation, or heart rate. The smartphone can then transmit the sensor data to the server. In some implementations, the smartphone can perform local computations on the sensor data prior to transmitting the data to the server.

The server can update the timing of the messages and the type of triggers associated with each of the messages responsive to the returned data. For example, receiving data that indicates that the patient's blood oxygenation is low, the server can dynamically update the next message to transmit to the patient's smartphone sooner than originally scheduled. The server can also change the message's trigger from a monitoring focused trigger to an action focused trigger. For example, noticing the low blood oxygenation, a trigger that activates oxygen flow to the patient can be included in the message. The trigger can be transmitted to the smartphone. Receiving the message and activating the trigger, the smartphone can launch a routine that wirelessly activates a control valve of an oxygen tank supplying oxygen to the patient. Activating the control valve can enable additional oxygen to flow to the patient to counter the low blood oxygenation.

In some implementations, the above described server 202 is a dynamic content delivery and presentation management platform that transmits requests to user's mobile devices. As described above, the requests include triggers that can cause an application executing on the mobile device to display one or more messages. In some implementations, where the remote computing device is displaying information, such as a notification or message, on the display of the remote computing device, waking the remote computing device at the regular, predetermined intervals can create "message blindness." Message blindness can include the situation when a user of the remote computing device begins to ignore messages displayed on the remote computing device because they occur too frequently, not at the proper time, or with non-relevant information. As described herein, the server can select times to transmit requests or messages to the remote computing device based on when they are pertinent, which increases the efficiency of the remote computing device because the device does not respond have to respond to messages that provide little additional benefit. Selecting opportune times for message delivery can also reduce message blindness because the message are transmitted to the remote computing device at times when the user is most likely to act on the message. Increasing the efficiency of the mobile device can include increasing the length of time the mobile device can remain on without being charged, reducing the amount of battery consumption due to activity from the server 202, reducing the amount of network bandwidth consumed by the mobile device, reducing the amount of data or requests the mobile device receives from the server, among others. For example, by delivering fewer requests at dynamically selected times instead of sending more requests at fixed periods of time, the server can improve the battery life of the mobile device. In some implementations, the messages displayed in response to triggers are referred to as emergency flows. An emergency flow can include a set of routines or procedures to help users mitigate experiences which may lead to undesirable neurobehavioral cascades—such as cravings and other withdrawal symptoms of a smoking cessation attempt. Impulses, such as cravings and other withdrawal symptoms can generally be referred to as emergencies. An impulse can include any desire, urge, symptom, or other indication that may cause a user to want to voluntarily or involuntarily act or react. The emergency flows are provided to the user when the user experiences an impulse, or otherwise indicates that the user is experiencing an emergency, or when another user of social relevance experiences an emergency. Other impulses can include withdrawal symptoms, side effects of pharmacologic treatments, lapses, resistances, physiological states (e.g., nausea), psychological states (e.g., emotions and sentiments, such as depression), and behavioral changes (e.g., abnormal sleep). The emergency flows are configured to provide the user with "just-in-time-interventions" (JITIs) that help mitigate her emergencies or the emergencies of others. The emergency flows can mitigate the emergencies by providing the user with a gateway to highlight and access the most likely tools the user may use in response to the emergencies.

For example, external (and internal) stimulus can trigger a sentiment that can lead to a behavior. This behavior can in turn act as a stimulus for another behavior, and so on, causing a cascade of neurobehavioral events that can ultimately result in a habit-forming chain of undesirable behaviors (a neurobehavioral cascade). The emergency flows of the behavioral change platform can help the user identify and carry out actions that would provide an environment in which the user is unlikely to fall into an undesirable neurobehavioral cascade—using, for example, the above described missions. If the user does begin a neurobehavioral cascade, the emergency flows displayed on the user's device in response to triggers from the behavioral change platform can provide a JITI that helps avert the neurobehavioral cascade. The interface of the present disclosure can provide the user with an "emergency button" that enables the user to be presented with an emergency flow when an emergency, such as a craving, presents itself to the user.

Figure 15:
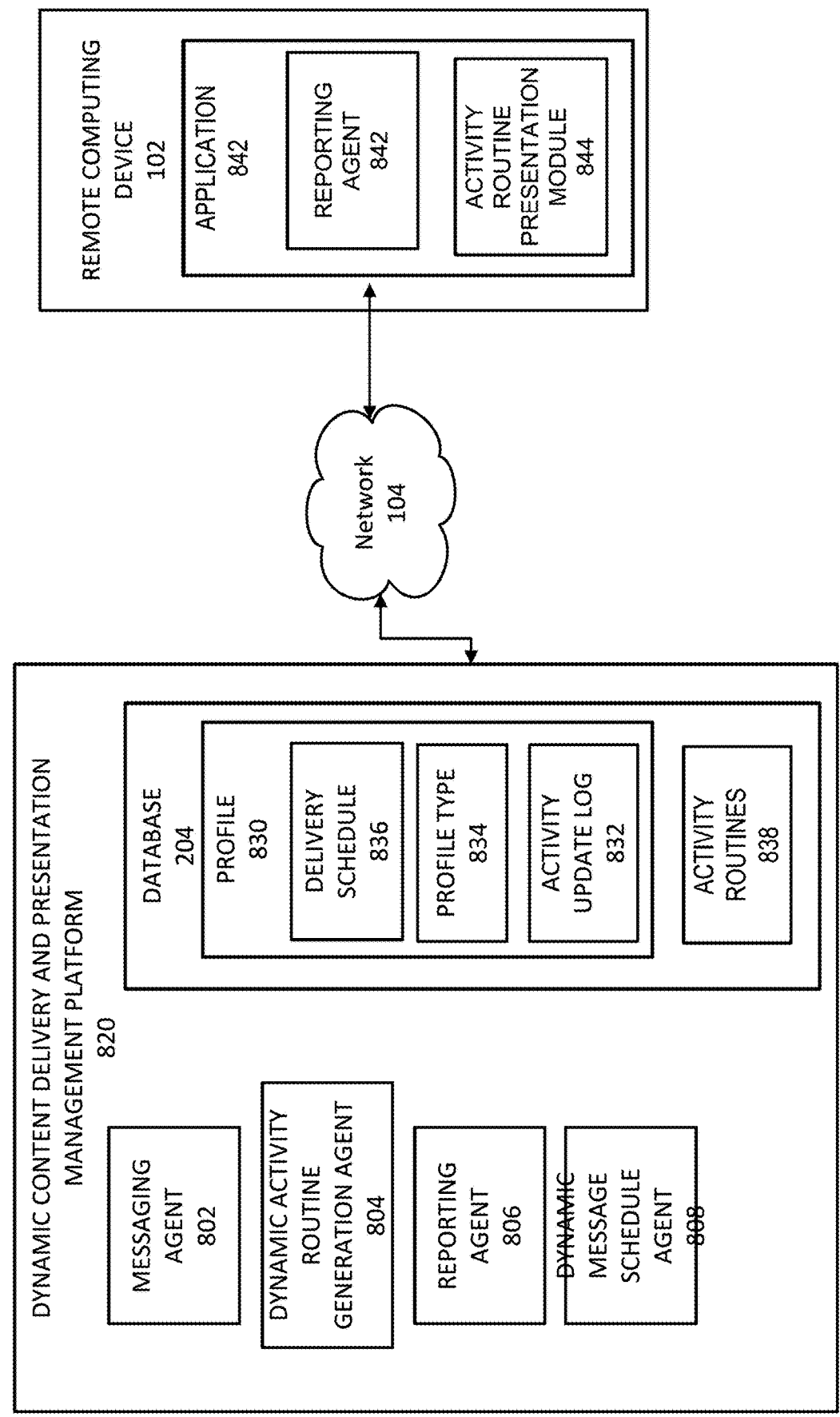
FIG. 15 illustrates a block diagram of an example dynamic content delivery and presentation management platform.

FIG. 15 illustrates a block diagram of an example dynamic content delivery and presentation management platform 820. In some implementations, the dynamic content delivery and presentation management platform 820 can be similar to the behavioral change platform 120. The dynamic content delivery and presentation management platform 820 includes a messaging agent 802, a dynamic activity routine generation agent 804, reporting agent 806 and a dynamic message schedule agent 808. The platform 820 can also include a database 204 that stores profile information corresponding to each of a plurality of applications installed on remote computing devices, such as the remote computing device 102. The profile information of each application can include a delivery schedule 836, an activity update log 834, as well as profile type related information 832.

The platform 820 can be configured to communicate with a plurality of remote computing devices 102. Each of the remote computing devices 102 can include an application 842 configured to enable the remote computing device 102 to communicate with the dynamic content delivery and presentation management platform 820. The application 842 can include a reporting agent 842 and a activity routine presentation module 844.

The messaging agent 802 can be configured to generate messages for transmission to the remote computing device 102. The messaging agent 802 can be configured to generate messages for respective applications 842 executing on the plurality of remote computing devices 102 with which the platform 820 is configured to communicate. The messaging agent 802 can be configured to generate the messages according to a delivery schedule 836. The delivery schedule can be generated by the dynamic message schedule agent 808 as will be described below.

The messaging agent 802 can further be configured to update a profile 830 of the application 842 each time the messaging agent 802 sends a message to the remote computing device associated with the application 842. The messaging agent 802 can update the activity update log 832 of the profile 830 to include a message identifier uniquely identifying the message, the content included in the message and the date and time at which the message was transmitted. In some implementations, the messaging agent 802 can identify the delivery channel over which the message was transmitted, for instance, SMS, push notification, email, among others. The messaging agent 802 can update the activity update log each time the messaging agent sends a message to the remote computing device 842.

The messages generated by the messaging agent can include content and a trigger. The content can include text. The trigger can include a link, URL, or other instruction, which when activated at the remote computing device 102, causes the remote computing device to launch a particular resource of the application 842 installed on the remote computing device 102. Details regarding the resource of the application that is launched are described below. The messaging agent 802 can transmit the messages to the remote computing device 102 via a push messaging service, a cellular communications network, or a cellular data network, among others.

On the remote computing device, the message can be received as a notification, a message or as any other type of communication. The message can be displayed on a screen of the computing device 102. The message can include the trigger, which when activated (by a click, tap, or other activation mechanism), the remote computing device can be caused to launch the particular resource of the application and display the particular resource within an environment of the application on the remote computing device.

The activity routine presentation module 844 of the application 842, responsive to the application being launched via the trigger, can be configured to transmit a request to the platform 820 indicating that the application was launched via a trigger included in the message. In some implementations, the activity routine presentation module 844 can include the message identifier of the message in the request. The message identifier of the message can be used by the platform 820 to determine which message transmitted by the messaging agent 802 caused the application to be launched on the client device. In addition, the request can include a time at which the application was launched.

Responsive to the request being received by the platform 820, the messaging agent 802 can update the activity update log of the profile 830 to include data indicating that the trigger of the message identified by the message identifier was activated and the time at which it was activated.

The dynamic activity routine generation agent 804 can be configured to determine that the application is launched at the remote computing device via the trigger via the request transmitted by the remote computing device. The dynamic activity routine generation agent 804 can then determine a profile associated with the application 842 of the remote computing device 102 (via the message identifier or any other identifier identifying either the remote computing device 102 or the application 842). The dynamic activity routine generation agent 804 can then identify a profile type associated with the application and previous activity data associated with the application to determine, one or more activities routines to provide the application 842 for presentation at the remote computing device.

The dynamic activity routine generation agent 804 can be configured to select one or more activity routines from a activity routines table 838 including a list of activity routines stored in the database 204. Each of the activity routines stored in the table 838 can be tagged with one or more profile types. The dynamic activity routine generation agent 804 can be configured to access the table 838 and generate a subset of the list of activity routines by removing activity routines that are not tagged with the profile type 834 of the profile. The dynamic activity routine generation agent 804 can then further remote activity routines from the subset based on previous performance history of the activity routine on the application 842 of the particular remote computing device 102. In some implementations, the dynamic activity routine generation agent 804 may remove activity routines previously provided to the application that were either not activated at the application, or if they were activated, were either not completed or indicated as not working.

The dynamic activity routine generation agent 804 can then select one or more activity routines from the subset of activity routines corresponding to the application 842 and generate a response to the request that includes the activity routines or one or more identifiers identifying the activity routines. The response is then transmitted to the remote computing device 102.

The activity routine presentation module 844 can be configured to receive the activity routines or the identifiers thereof, and to generate an activity routine presentation that includes links to the one or more activity routines included or identified in the response. The activity routine presentation module 844 can then cause the remote computing device 102 to present the activity routine presentation within the environment of the application.

The activity routine presentation module 844 can then track activity of the application and interactions with the one or more links to the activity routines. The activity routine presentation module 844 can be configured to cause one or more of the activity routines to execute on the application responsive to detecting an interaction with the one or more links to the activity routines.

The reporting agent 842 can be configured to monitor the activity routines executing within the application. In some implementations, the reporting agent 842 can monitor a time at which the activity routine was initiated, a time at which the activity routine was completed, a time at which the activity routine was interrupted by another computer function occurring in another process of the computing device, or a time at which the activity routine was paused or stopped due to an interaction within the environment of the application. In some implementations, the reporting agent 842 can generate one or more messages to send reporting data to the platform 820.

The reporting agent 806 of the dynamic content delivery and presentation management platform 820 can associate the received reporting data with the transmitting remote computing device 102 and store the received reporting data in the profile 830 maintained on the database 204.

The dynamic message schedule agent 808 can be configured to generate, update and maintain the delivery schedule 810 stored in the profile 830 that is maintained on or within the database 204. The dynamic message schedule agent 808 can be configured to generate a message schedule for remote computing devices on which an application of the platform 820 is installed. The dynamic message schedule agent 808 can be configured to access the database 204 and identify the profiles associated with each of the applications of the platform 820 installed on the plurality of remote computing devices 102. For each profile, the dynamic message schedule agent 808 can generate an initial delivery schedule 836. The initial delivery schedule can include a number of preset times at which messages are to be transmitted to the remote computing device. In some implementations, the dynamic message schedule agent is configured to limit the number of messages that can be transmitted to the remote computing device associated with the profile in a predetermined time period, for instance, 4 messages in a 24 hour time period.

Responsive to generating the initial delivery schedule, the platform 820, via the messaging agent 802, delivers messages according to the initial delivery schedule. As messages are transmitted and activity updates related to the messages are received by the platform 102 from the remote computing device for the messages, the activity updates are stored in the activity update log by the messaging agent 802 or the reporting agent 806.

The dynamic message schedule agent 808 can then monitor, for each message transmitted to the application 842, a time at which the message was transmitted, a time at which the message was accessed, a time at which the trigger included in the message was activated (if at all), and whether an activity routine was executed on the application responsive to presenting the one or more activity routines via the activity routine presentation module 844.

The dynamic message schedule agent 808 can then determine, based on the activity data associated with each of the messages, adjustments to the times at which the messages were transmitted. In some implementations, the times included in the initial delivery schedule can be changed to match the time at which the trigger included in the particular message was actually activated. In some implementations, the times included in the initial delivery schedule can be changed to be closer to the time the trigger was activated. By updating the delivery schedule and monitoring for additional activity updates based on the messages transmitted according to the updated delivery schedule, the dynamic message schedule agent can iteratively improve the message schedule to transmit messages at the most opportune times to facilitate application usage and reducing the number of unwanted, unopened or undesired messages. Moreover, the iterative improvements to the dynamic message schedule based on prior activity on previously sent messages can further reduce the time between a message being transmitted to the remote computing device and the time at which the trigger in the message is activated.

It should be appreciated that the dynamic activity routine generation agent 804 can also be configured to improve the selection of activity routines to provide to the remote device based on the past performance of the activity routines. By iteratively sending activity routines and monitoring activity on the activity routines, the dynamic routine generation agent 804 can improve the selection of activity routines and further reduce the number of unwanted, unopened, or undesired routines delivered to the remote computing device. By identifying low performance routines for each remote computing device, the dynamic activity routine generation agent 804 can reduce computer resource consumption when determining which activity routines to select as the subset of activity routines to select from and/or parse through is reduced.

Figure 4:
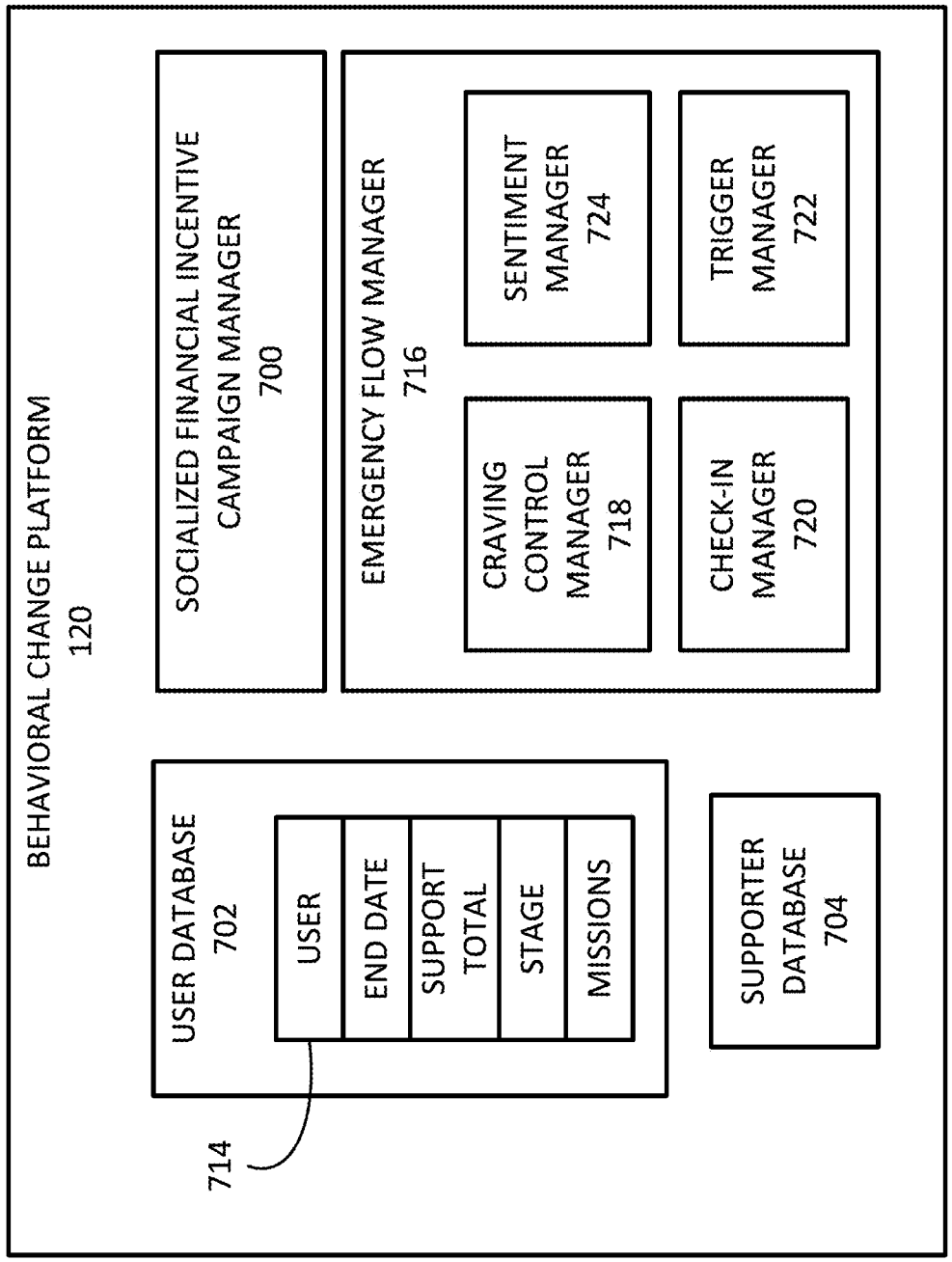
FIG. 4 is a block diagram of an example system for providing emergency flows.

FIG. 4 illustrates a block diagram of an example behavioral change platform 120. The behavioral change platform 120 includes hardware and/or software and is configured to bring about behavioral changes in users of the behavioral change platform 120. The behavioral change platform 120 includes a plurality of modules, components or other entities that execute within the behavioral change platform 120. The components of the behavioral change platform 120 can include applications, programs, libraries, scripts, services, processes, tasks and/or any type and form of executable instructions executing on a device, such as a mobile device, computer, or server. The behavioral change platform 120 can include any of the components of the other behavioral change platforms 120 described herein. The behavioral change platform 120 can include a user database 702, supporter database 704, and socialized financial incentive campaign manager 700. The behavioral change platform 120 can also include an emergency flow manager 716. The emergency flow manager 716 can include a craving control manager 718, a check-in manager 720, a trigger manager 722, and a sentiment manager 724.

The user database 702 of the behavioral change platform 120 can includes a plurality of tables and entries for each of the users of the behavioral change platform 120. In some implementations, the database can include information about each of the users seeking to use the behavioral change platform 120 to change one or more behaviors. Examples of behaviors can include smoking, dietary behavior, such as uncontrolled eating, drug use, or other dependency-related disorders that have a craving-withdrawal effect. Such behaviors may be habit forming and may have an addiction component to them. In other implementations, the behaviors can include behaviors the user wishes to begin, such as working out, attending classes, or eating a healthier diet. In some implementations, the behaviors can be related to personality traits, for example, schizophrenia, bipolar, and other mood disorders. In some implementations, the behaviors can be related to personal hygiene or other personal habits. The information about each of the users can be stored in a user entry 714. The entry 714 can be an implementation of the profile 210. Each user entry 714 in the user database 702 can include information about the user, such as, an end date by which time the user would like to implement the behavioral change; a support total that can indicate the total amount of financial incentives the user's supporters have pledged to date; a current stage in the behavioral modification processes; and actions—e.g., missions, habits, strategies, preventative strategies, etc.—that can be or have been performed by the user to help divert the user's attention to emergencies.

The behavioral change platform 120 can also include a supporter database 704. The supporter database 704 can include one or more tables having entries for each of the users listed in the user database 702. Information regarding supporters of a specific user can be stored in one or more tables having entries linked to the specific user. For example, the user may ask for family members and loved ones to support the user in the journey to achieving a predetermined behavioral endpoint. In some implementations, the user's journey toward a behavioral endpoint or attempt to change a habit together with their broadcasting of that journey to supporters of their choosing is referred to as a campaign. The supporters can provide encouragement to the user to help the user reach the behavioral endpoint. In some implementations, the supporters can provide financial incentives to the user if the user reaches the behavioral endpoint. For example, a first supporter of a user may pledge to give the user $100 and a second supporter of the user may pledge to give the user $50 if the user quits smoking. In other implementations, the supporters can provide data to the behavioral change platform 120, such as indications that the supporter witnessed the user engaging in an undesirable behavior (e.g., smoking).

In some implementations, the supporter can be an entity, such as a company, rather than a person. For example, the supporter may be an insurance company, a physician's practice, or a gym. The entity can sponsor the user's campaign but rely on individual sponsors to validate whether the user actually achieved the predetermined behavioral endpoint. In this way, the entity does not need to spend resources to independently determine whether the user has achieved the behavioral endpoint, but rather, can leverage the information provided by other vested sponsors to validate that the user did achieve the predetermined behavioral endpoint.

As an overview of the emergency flow manager 716, the emergency flow manager 716 can be any script, file, program, application, set of instructions, or computer-executable code, that is configured to enable the behavioral change platform 120 on which the emergency flow manager 716 is executed to mitigate negative emergencies using cognitive behavior therapies. The behavioral change platform 120 helps modify a user's behavior by providing the user with acknowledgement, connection, empowerment, reaction, and reflection cognitive cues. The acknowledgement cues can be an initial message presented to the user, and can acknowledge, in simple language, what the user is experiencing. These messages can draw on the knowledge the user built during their quit journey and can bring awareness to the emergency.

The behavioral change platform 120 can also provide the user with a connection cue, which can allow the user to contextualize her experience within the broader realm of all of her peers' experiences. The connection cue can help the user know that the user has support from supporters and is not alone. The connection cue can help prevent or restrict a negative sentiment from triggering an onset of an undesirable neurobehavioral cascade. This connection cue can draw upon the user's sense of connectedness the user has gathered over a quit journey. The connection cue can also be in the form of words and maps. In the former, quotes relevant to the emergency attributed to well-regarded persons can serve to remind the user that the user is not alone. In the latter, the user can visualize experiencing similar emergencies geospatially and temporally proximate to the user. In some implementations, the emergency flow manager 716 can be configured to generate a map that includes a plurality of nodes, each representative of a user of the behavioral change platform 120. The nodes can represent users who are geospatially proximate to the user and that have indicated experiencing similar emergencies within a predetermined time period relative to a time at which the user indicated an emergency. The empowerment cue is configured to help the user stop neurobehavioral cascades. The empowerment cue can include a message that helps remind the user of past strengths (e.g., overcoming life challenges in the past), present values (e.g., quit motivations through words or pictures), and a possible desirable future (e.g., showing potential gains to health, money, or willpower if the user overcomes the emergency). This empowerment message can draw upon the user's motivation and willpower gained during the quit journey. The reaction cue presents a list of contextual, intelligently-ordered actions the user can take to alter the likelihood that points her away from an undesirable neurobehavioral cascades and towards desirable or healthy ones. For example, the reaction cue can suggest specific strategies the user has developed through the quit journey—e.g., breathe deeply when anxious. The strategies can draw upon a user's full bank of Knowledge, Motivation, Willpower, and Connectedness gained through the quit journey. The reflect cue can provide the user with a mechanism to introspect on the way the emergency was handled. At a minimum, the reflect cue includes a mechanism to report whether the emergency averted an undesirable neurobehavior cascade—completing a feedback loop that furthers the effectiveness of emergency flows in future episodes. The reflect cue may also include mechanisms to identify the triggers that set off the emergency and strategies for minimizing the occurrence and/or causal power of those triggers in future. The emergency flow can also enlist other users to contribute connect, empowerment, and reaction cues in response to a user's emergency.

The emergency flow manager 716 of the behavioral change platform 120 can receive inputs about the user's habits and actions, or make predictions thereof, and generate emergency flows that can help the user mitigate symptoms. The craving control manager 718 can be any script, file, program, application, set of instructions, or computer-executable code, that is configured to enable the behavioral change platform 120 on which the craving control manager 718 is executed to determine when an emergency flow should be provided to the user. In some implementations, the determinations made by the craving control manager 718 to provide emergency flows to the user can be based on self-reported indications from the user (e.g., the user requesting an emergency flow through the use of the emergency button) or based on a prediction (e.g., the user is feeling anxious, which can often lead to the user experiencing an emergency, such as a craving).

In some implementations, the user can select an emergency flow for display. In other implementations, the craving control manager 718 can select the emergency flow for presentation to the user. For example, the user may not know what type of emergency flow would allay the impulse the user is experiencing. Based on the user's history, the control manager 718 can rank and select the emergency flow based on the probability that the emergency flow can help abate the user's current impulse. The determination of what emergency flow to present to the user can be based on a policy that defines what emergency flow is presented to the user for a given impulse. In other implementations, the determination of what emergency flow to present to the user is adaptive and changes along the user's quit journey. The emergency flows can be categorized as abating flows, delaying flows, and rationing flows. An abating flow may stop the neurobehavioral cascade and help the user not engage in the behavior the user is trying to stop. For example, if the user is trying quit smoking, the abating flow may present a mission to the user such as a breathing exercise to help the user not give in to a craving to smoke a cigarette. In a delaying flow, the user may be allowed to engage in the undesired behavior, but only after a predetermined delay. For example, the user may be allowed to smoke a cigarette, but only after a 5-minute wait. In some implementations, after the wait, the user may decide if the craving has passed and not smoke the cigarette. In some implementations, as the user interacts with the behavioral change platform 120 more, the delay time may increase with each presentation of a delaying flow. The rationing flow may allow the user to engage in the undesired behavior; however, the user may only be allowed to enter this flow a predetermined number of times during a given time period. For example, the rationing flow may be presented to the user 5 times during a day—each time allowing the user to smoke one cigarette each time. As the user continues to use the behavioral change platform 120, the ration (for instance, a daily ration) may be reduced each day. In some implementations, when the user is presented a delaying flow and engages in the undesirable behavior after the delay, the delayed flow may count toward the number of times the rationing flow can be presented to the user.

The emergency flow manager 716 can also include a check-in manager 720. The check-in manager 720 can be any script, file, program, application, set of instructions, or computer-executable code, that is configured to enable the behavioral change platform 120 on which the check-in manager 720 is executed to present questions to the user randomly or at predetermined times during the day. The questions may ask the user to log the number of times the user engaged in the undesirable behavior during the day. The questions can be presented to the user to cause the user to report the occurrences of the undesirable behavior that the user didn't enter into the behavioral change platform 120. For example, at the end of the day, the check-in manager 720 may request the user enter the total number of cigarettes the user smoked during the day. The check-in manager 720 can also present questions to the user about the user's emotional, behavior, and physiological state. The questions about the user's state may be presented to the user at random intervals, predefined intervals, or the user may enter the state information at times of choosing by the user. The states can include the occurrence of a craving, anxiety, depressions, lack of focus, abnormal sleep, headache, distractions, restlessness, abnormal breathing, headaches, or any combination thereof. The check-in manager 720 can generate the questions that are presented to the user by executing a questionnaire policy. The questionnaire policy can include a number of rules and questions associated therewith. For example, the questions can be pre-generated and stored in a lookup table. Executing the questionnaire policy enables the check-in manager 720 to select the appropriate questions from the lookup table to display on a mobile device of the user. In some implementations, the questions displayed by the behavioral change platform 120 are generated responsive to inputs received by the behavioral change platform 120. For example, the check-in manager 720 may process the user entry 714 stored in the user database 702 with a learning algorithm to generate questions that are tailored to the data of the user.

The trigger manager 722 can be any script, file, program, application, set of instructions, or computer-executable code, that is configured to enable the behavioral change platform 120 on which the trigger manager 722 is executed to predict when the user may need to be presented with an emergency flow. The predictions made by the trigger manager 722 can be based on the information obtained or received from the check-in manager 720. The predictions can also be based on data about the user stored in the user database 702, such as what stage in the quick journey the user is (e.g., precontemplation, contemplation, preparation, action, and maintenance, termination) on and what missions the user has completed. In some implementations, the trigger manager 722 can determine to present the emergency flows to the user based on self-reported indications from the user or socially reported indications from supporters of the user. In some implementations, the trigger manager 722 can be a component of the predictive analysis module 2 described above. The trigger manager 722 can make predictions on when to present an emergency flow to the user using machine learning algorithms that take as input the time that previous cessation emergencies occurred, the user's current location, the user's social setting, and the user's state of mind.

The emergency flow manager 716 can also include a sentiment manager 724. The sentiment manager 724 can be any script, file, program, application, set of instructions, or computer-executable code, that is configured to enable the behavioral change platform 120 on which the sentiment manager 724 is executed to enable users of the behavioral change platform 120 to share experiences and support one another. For example, the sentiment manager 724 can generate real-time stimuli of notes, messages, and media that are viewable to other users of the behavioral change platform 120. The sentiment manager 724 can present the stimuli to the user via the GUI of an application executing on a smart phone. The GUI can include one or more content slots into which the stimuli are placed by the sentiment manager 724. In some implementations, the sentiment manager 724 selects one or more stimuli from a stimulus database to generate a customized feed for the user of the behavioral change platform 120. The GUI can include a limited number of content slots, and the sentiment manager 724 can select the most relevant stimuli to the user for display in the content slots. In some implementations, the sentiment manager 724 can also reposition or reorganize the placement of the stimuli into different content slots based on the limited display area of the GUI or an updated ranking of the relevance of the stimuli. The sentiment manager 724 can select, for example, 10 stimuli that meet a predetermined criteria. The criteria can include the stimuli labeled with sentiments, intensities, or a combination thereof that match or are close to that of the user. The user can also post messages to the community using a freeform textbox. The user can post messages via a textbox displayed on the user's smartphone or other client device about past emergencies, current emergencies, and positive experiences in overcoming emergencies. In some implementations, when the user posts a stimulus to the community via the sentiment manager 724, the sentiment manager 724 can automatically append a time, date, the user's quit day, the user's current emergency, type of emergency, and intensity of emergency, whether the user is using a quit aid, or any combination thereof.

In some implementations, the sentiment manager 724 can pair users with positive sentiments or experiences with users currently experiencing negative sentiments. In some implementations, the sentiment manager 724 matches positive sentiment messages to users that are currently experiencing negative sentiments. In some implementations, the sentiment manager 724 can use a neural network to determine if the stimulus the user contributes is negative or positive, and in some implementations, the user can select a negative or positive sentiment button to identify their contributed content as negative or positive sentiment stimuli. The sentiment manager 724 can maintain one or more databases into which the positive and negative sentiment stimuli are stored. For example, the negative sentiment stimuli can be stored in a first database and the positive sentiment stimuli can be stored in a second database or the positive and negative sentiment stimuli can be stored in the same database and be flagged to indicate whether they are positive or negative. The sentiment manager 724 can then retrieve positive or negative sentiment stimuli from the respective databases by performing a table lookup. In some implementations, the negative sentiment users can rank displayed stimuli for their relevance in abating the emergency. For example, the users can rank stimuli from 0-2. Those receiving a score below a predetermined threshold—for example, 0.5—may not be shown to additional users.

In some implementations, the sentiment manager 724 can pair positive sentiment users with negative sentiment users, and the positive sentiment users can provide encouragement to the negative sentiment users. For example, the positive sentiment user may be paired with some other users to provide messages. The positive sentiment user may be provided a text that states "You are helping users experiencing [a type of emergency, feeling, or emotion]," and the user may then be provided with a text box to enter a message to help the negative sentiment user.

In other implementations, the sentiment manager 724 can also enable users to assist one another during emergencies. In addition to users sharing messages, the sentiment manager 724 can also enable users to share support media (e.g., SMS messages, photos, videos), a digital touch (e.g., an Apple Watch heartbeat message), or diversions (e.g., a telephone call or playing a digital game together). In some implementations, the sentiment manager 724 can randomly match negative sentiment and positive sentiment users. In other implementations, the users can self-organize groups that contribute supportive messages, media, digital touches, or diversions to one another.

Figure 5:
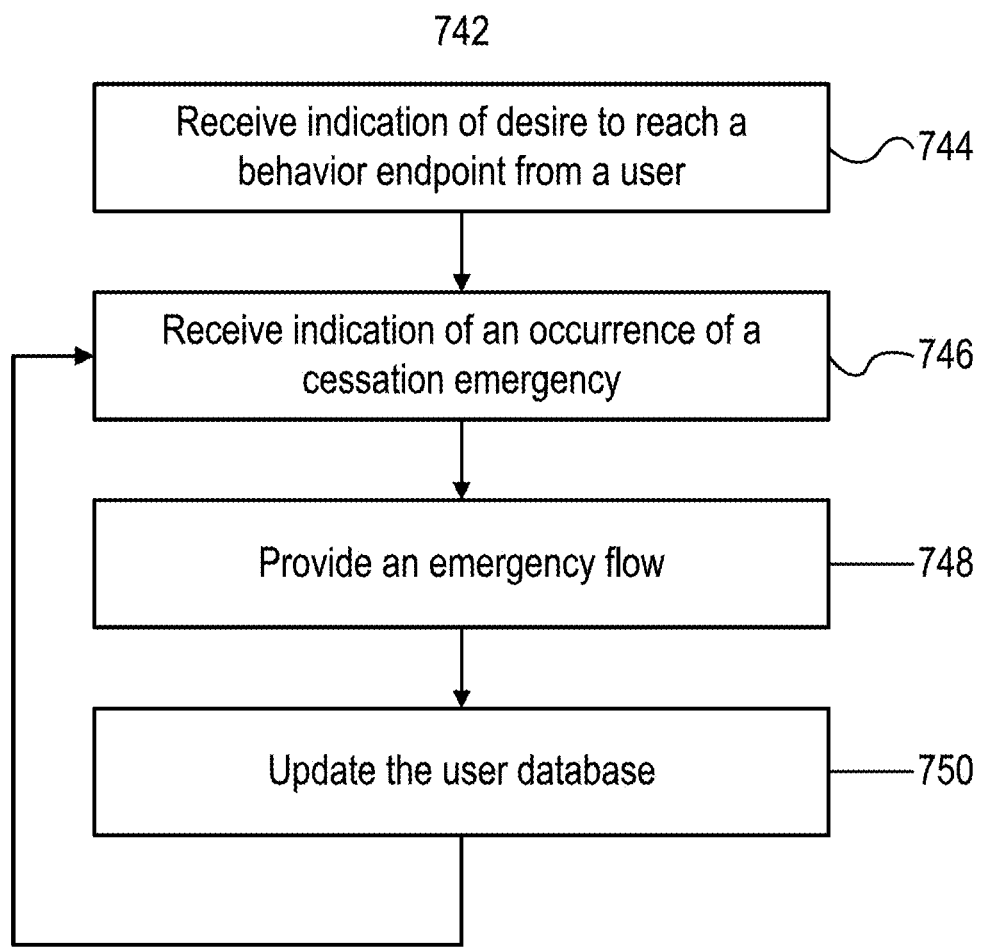
FIG. 5 illustrates a block diagram of an example method for disrupting a neurobehavioral cascade using the system illustrated in FIG. 4.

FIG. 5 illustrates a block diagram of an example method 742 for disrupting a neurobehavioral cascade. The method 742 can include receiving an indication of a desire to reach a behavioral endpoint (BLOCK 744). The method 742 can also include receiving an occurrence of a cessation emergency (BLOCK 746). The method 742 can also include selecting an emergency flow and providing the emergency flow to the user (BLOCK 748). The method 742 can also include updating the user database when the user completes an emergency flow (BLOCK 750).

Figure 6:
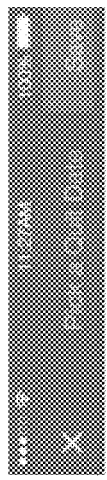

As set forth above, the method 742 can include disrupting a neurobehavioral cascade by receiving an indication of a desire to reach a behavior endpoint (BLOCK 744). The indication can be received by the behavioral change platform 120 from a user. The user can interact with the behavioral change platform 120 through a mobile application or a website. For example, the behavioral change platform 120 may interface with a mobile application, when the user signs into the application for the first time, the application can ask the user what habit (or endpoint) the user would like to start (e.g., what good habit the user would like to start, such as exercising regularly) or stop (e.g., what bad habit the user would like to stop, such as smoking). FIG. 6 illustrates an example interface 752 of a mobile application that the user can interact with to provide the behavioral change platform with a desire to reach a behavioral endpoint (e.g., quitting smoking) and a date by which to achieve that behavioral endpoint.

The method 742 can also include receiving an indication of the occurrence of a cessation emergency (BLOCK 746). In some implementations, the indication is based on a prediction made by the trigger manager 722 of the behavioral change platform 120. For example, based on input provided to the check-in manager 720 by the user, the trigger manager 722 may determine that the user typically experiences an emergency around 2 PM each day, and a prediction may be made that an emergency flow should be provided to the user at 1:55 PM. In other implementations, the indication may be generated responsive to a user input. For example, an application executing on a user's mobile device may include an "emergency button" that generates and sends the indication to the behavioral change platform 120.

Figure 7:
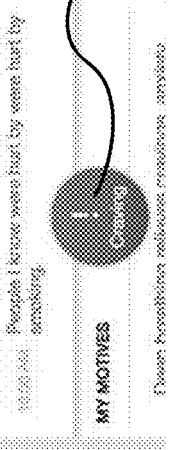
FIGS. 6-14 illustrate example user interfaces of applications for providing emergency flows.

FIG. 7 illustrates an example interface 754 of a mobile application with an emergency button 756. Responsive to selecting the emergency button 756, the user can be presented with an interface that enables the user to selected which of an abating flow, delaying flow, and rationing flow the user would like use. In some implementations, the emergency button 756 can also be used to input lapses, such as smoking a cigarette, and sentiments, such as the user's state at different times. The lapse input and the sentiment input may be entered into by doubling tapping the emergency button 756.

In some implementations, the emergency button 756 is presented via a mobile device in a manner that reduces the number of steps the user must take to select or activate the emergency button 756. The emergency button 756 can be presented directly on the home screen, the lock screen, or notification menu of the user's mobile device or smart watch such that the user does not need to open an application to access the emergency button 756. For example, the emergency button 756 can be displayed as a widget on the lock-screen, home screen, or notification bar of a smart phone. In other implementations, the emergency button 756 can be accessed by long pressing or deep pressing the icon of the mobile application associated with the behavioral change platform 120. The emergency button 756 can be the user's primary location for interacting with the behavioral change platform 120. For example, when the user experiencing any type of impulse, sentiment, emotion, awareness, or other type of emergency the user can select the emergency button 756 to quickly gain access to one or more emergency flows. In yet other implementations, the emergency button 756 can presented to the user in an always present notification bar or as a time-sensitive notification. The time-sensitive notification may be presented to the user when the trigger manager 722 or predictive analysis module 2 of the behavioral change platform 120 determines the user is most likely to experience a craving, impulse, sentiment, or physiological or psychological state that is likely to result in an undesirable behavior. For example, the predictive analysis module 2 can predict when the user may experience a craving using previous and current data provided by the user and other users of the behavioral change platform 120. For example, the predictive analysis module 2 of the behavioral change platform 120 may analyze the previous occurrences of the user's cravings and detect times in the day when the cravings are most likely to occur. The predictive analysis module 2 may also use location and setting based information do determine when cravings are more likely to happen. For example, a craving for a cigarette may be relatively more likely to occur when at a bar or at the user's home than compared to when the user is at work (or another location where smoking is not allowed). In general, each of the different methods of presenting the emergency button 756 to the user are configured to increase the ease of use and the likelihood the user will use the emergency button 756. Increasing the ease of use, and thus the engagement of the user, enables the behavioral change platform 120 to be more accurate in its predictions before the use is more likely to input the occurrence of cravings.

Figure 8:
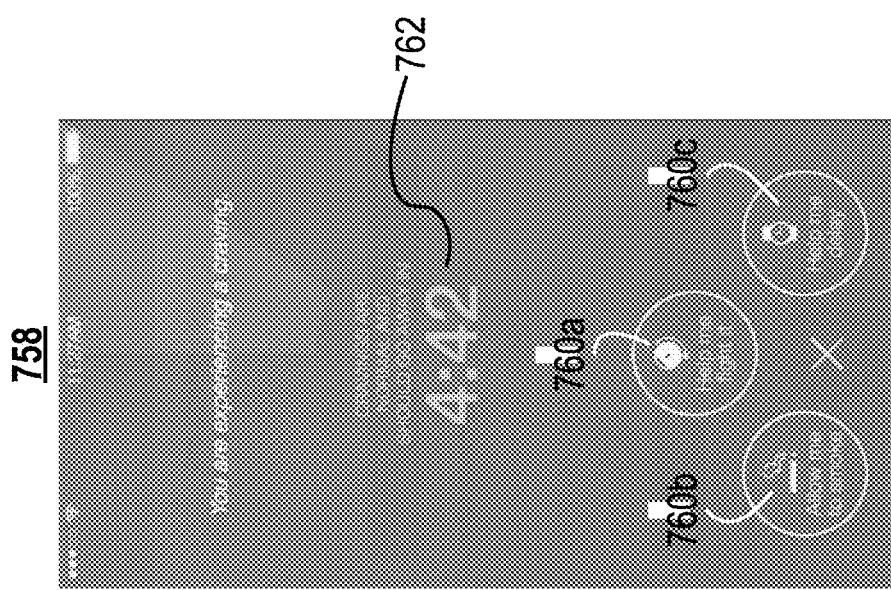

FIG. 8 illustrates an example interface 758 for selecting a type of flow. As illustrated, the interface 758 includes a separate button for each of the possible emergency flow types. The interface 758 includes an abating flow button 760*a*, a rationing flow button 760*b*, and a delay flow button 760*c*. The interface 758 also includes a connect message in the form of a timer 762 that indicates to the user how long the user's emergencies last on average and how much time is remaining until the emergency will likely pass. The interface 758 also includes an acknowledgment message "you are experiencing a craving."

Referring to FIG. 5, the method 742 can also include providing an emergency flow to the user (BLOCK 748). In some implementations, the emergency flows can include one or more of the missions, strategies, and preventative strategies described herein. The missions can be mechanisms of action, such as activities, that can help the user deal with emergencies, such as cravings, or can provide distractions for the user when the user faces an emergency. The missions can include games, breathing exercises, physical exercise, and quizzes. The missions can be of any module type of intervention as highlighted earlier in the document—controlled breathing, social engagement, treatment adherence, digital diversions, among others. In some implementations, the behavioral change platform 120 can select a mission most likely to help the user end the present neurobehavioral cascade and resist the craving, impulse, or other emergency. The emergency flows can be provided to the user via an application executing on the user's mobile device that is in communication with the behavioral change platform 120.

In some implementations, the emergency flows are personalized for the individual user. For example, and as described above, the user may progress along a journey to change a behavior. The behavioral change platform 120 can employ a machine learning algorithm to determine which emergency flow to present to the user. The machine learning algorithm can select an emergency flow for presentation to the user that has the highest probability of helping abate the user's impulse. The machine learning algorithm bases the prediction on data stored in the user's profile. The data used by the machine learning algorithm can include: the present type of impulse experienced by the user, the types of emergency flows previously presented to the user, the success rate of each of the previously presented emergency flows in abating the user's impulses, the user's progress along a quit journey, the time of day the past impulses occurred, the location of the user when past impulses occurred and other environmental and behavioral factors. At different stages of the journey, different emergency flows may be presented to the user. For example, in one of the first stages of the quit journey as described above, the craving to engage in an undesirable behavior may be greater than during later stages. Accordingly, emergency flows presented during the early stages of the quit journey may be configured to mitigate the stronger emergencies. In one example, during a first stage, the user may be presented with an emergency flow that includes a mission to go for a 10 minute walk responsive to the appearance of the craving. In a later stage of this example, when the user is further along the quit journey the presented mission may include a breathing exercise. The personalization of the emergency flows can also correspond to the personalization of the emergency button 756. For example, when a user presses the emergency button 756, a number of possible emergency flows with different missions may be presented to the user. The selection of the emergency flows to present to the user can be based on the past and present user data as described below.

The behavioral change platform 120 may determine which emergency flow to present to the user using the staging module 6 and the emergency flow manager 716. The staging module 6 may assess how confident the user is (for example, does the user believe they can quit), how motivated the user is (for example, does the user have strong reasons to quit), how resilient the user is (for example, has the user tried to quit before), how knowledgeable the user is (for example, does the user have a solid understanding of pros and cons of quitting and smoking, withdrawal symptoms and how to address them), and how skilled the user is (for example, does the user have mechanisms to deal with cravings, withdrawal, and anxiety) when determining what type of emergency flow to present to the user. After the presentation of an emergency flow, the behavioral change platform 120 can be configured to receive input of how effective the emergency flow was in mitigating the emergency. The effectiveness of each of the emergency flows can also be used by the behavioral change platform 120 when generating a personalized emergency flow.

In some implementations, the emergency flow is generated responsive to the user's neurological profile. The neurological profile can describe the personality and mindset of the user. The behavioral change platform 120 can generate the user's neurological profile by presenting the user with a questionnaire when the user registers with the behavioral change platform 120. The questionnaire can include questions corresponding to responses to the questions. The user can select the appropriate responses to each question and based on the selected responses, the behavioral change platform 120 can generate a neurological profile of the user.

In yet other implementations, the emergency flow is generated responsive to a policy stored in the behavioral change platform 120. For example, the policy may include a predetermined sequence of emergency flows that a user progresses through during their quit journey. The emergency flows included in the policy may be configured to build knowledge, willpower, and skill of the user to enable the user to progress to the next stage of the user's quit journey.

In some implementations, if the user's negative sentiments or emergencies persist after a predetermined number of emergency flows are presented to the user, a triage flow can be presented to the user. In some implementations, the triage flow may include involving a medical professional, such as a quit coach or a physician. The triage flow may also be presented to the user if the user experiences a medical need after completing an emergency flow. In some implementations, the triage flow may prepopulate the user's mobile device with the phone number of a quit coach or physician. In some implementations, the triage flow provided to the user incorporates the cost of care and the severity of the user's emergency when selecting a flow to provide. For example, the user's use of a quit coach or a physician may be costlier then the use of a digital intervention. Users with relatively smaller emergencies (e.g., mild anxiety over quitting) may be provided a triage flow that includes a breathing exercise, while a user with a relative more severe emergency (e.g., a physical sickness from withdrawal) can be provided an triage flow that includes calling a physician.

Many undesirable behaviors share similar sets of emergencies and neurobehavioral cascades—e.g., impulses, cravings, negative emotional responses. And undesirable patterns of behaviors tend to be collocated in human populations. As such, mechanisms to mitigate the emergencies of one behavior in a user may be reused to achieve outcomes in another. To this end, the behavioral change platform 120 may prompt the user toward endpoint procession to achieve a second behavioral endpoint when a first behavioral endpoint is reached. For example, a user may initially attempt to reach a first behavioral endpoint of quitting smoking. Once the user maintains cessation of smoking, the behavioral change platform 120 may prompt the user to reach a related behavioral endpoint such as to quit drinking. For example, the behavioral change platform 120 may automatically select a new behavioral endpoint or the behavioral change platform 120 may inform that user that "X % of people that achieve Y move on to achieve Z."

Figure 9:
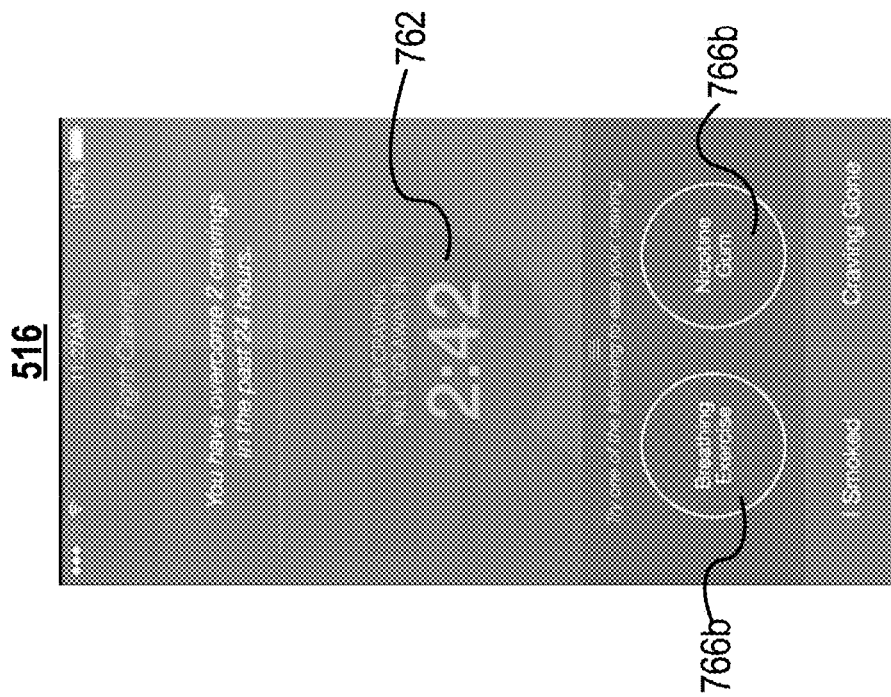

FIG. 9 illustrate an example interface 764 of an example mobile application providing an abating flow to the user. The example interface 764 can be presented to the user responsive to the user selecting the abating flow button 760a in the interface 758. In some implementations, the interface 764 presents the user with mission selection buttons 766a and 766b. Each of the mission selection buttons 766 are associated with a different mission, which begin responsive to the user selecting the associated mission selection button 766. The missions can include taking a walk, performing a breathing exercise, using nicotine gum, or other missions described herein. The timer 762 can continue, which can continue to show the user the expected amount of time the emergency will continue. The interface 764 can include empowerment messages that provide quit motivations and provide the user with indications of how many emergencies the user overcame in the last day, week, or month. The interface 764 can also include reflection messages in the form of buttons. A first reflection message can state "I smoked," which the user can select if the user was not able to overcome the craving and smoked. A reflection message can state "craving gone," which the user can select if the user overcomes the craving.

Figure 10B:
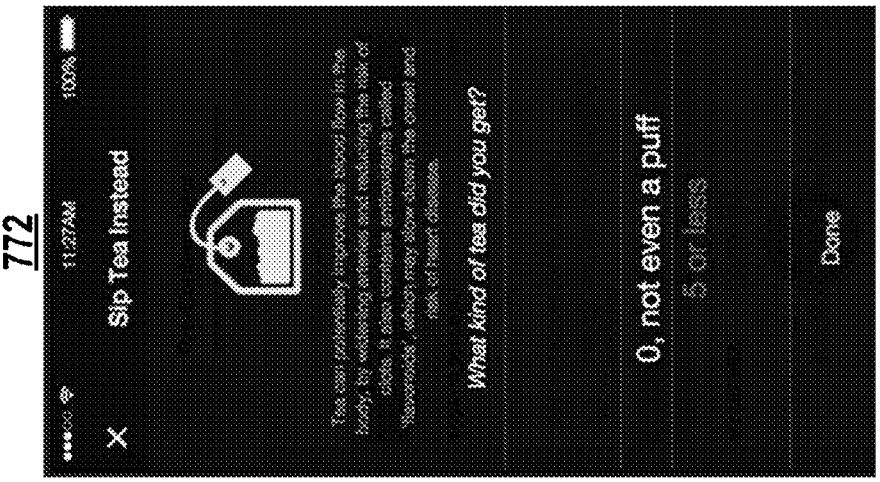
Figure 10A:
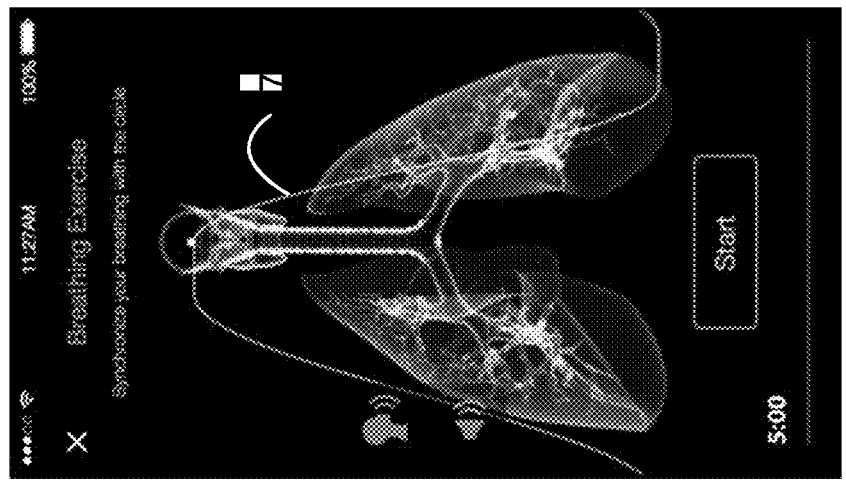

FIGS. 10A and 10B illustrate example interfaces 768 and 772 that are displayed responsive to selecting a mission. Once the user has selected a mission via the mission selection buttons 766 in interface 764, a mission interface is presented to the user. The mission interface 768 is an example interface that can be presented to the user when the user selects a breathing exercise mission. The interface 768 can include visual aids 770 that help the user control their breathing rate. For example, the visual aids 770 can include a waveform that illustrates when the user should inhale and exhale. A microphone of the mobile device executing the mobile application can detect the breathing sounds of the user to determine whether the user is inhaling and exhaling at the correct pace. The mission interface 772 illustrates an example interface for a mission that includes sipping tea rather than smoking a cigarette. The mission interface 772 can provide information about the benefits of tea and can also provide an input space where the user can input notes about the type of tea the user sipped.

Figure 11B:
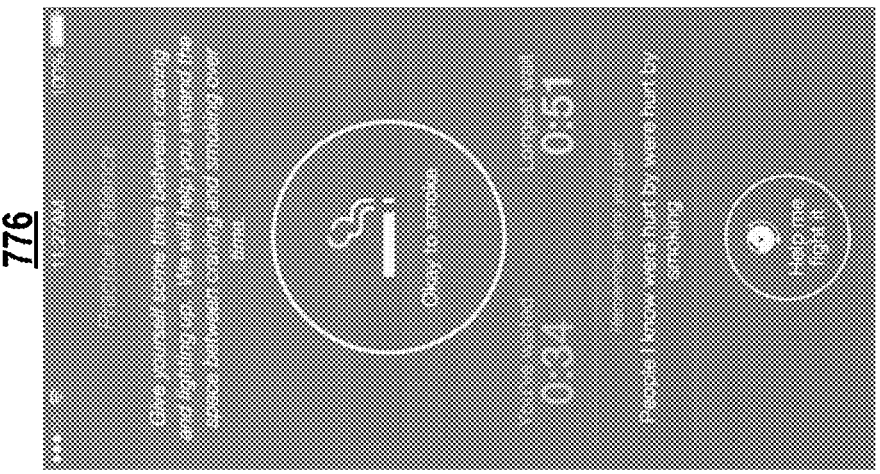
Figure 11A:
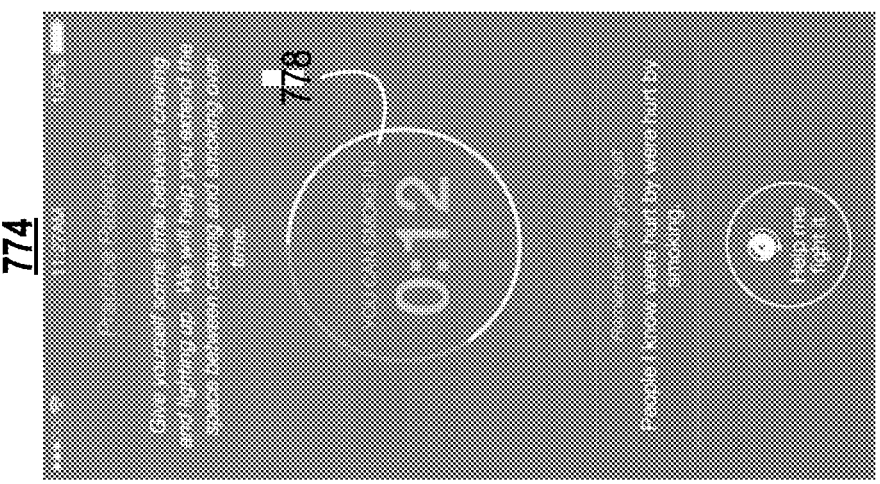

FIGS. 11A and 11B illustrate an example interface 774 and 776 that are displayed responsive to the user selecting the delaying flow button 760c in interface 758. The interface 774 is initially presented to the user and includes a countdown timer 778, which can be a form of a react message. The countdown timer 778 indicates to the user how much time is remaining until the user is allowed to engage in the undesired habit. The amount of time from which the countdown timer 778 counts down can be dynamically generated by a learning algorithm using the user's past interactions with the behavioral change platform 120. In some implementations, the delay flow button 760c is only present if the user has not yet met the daily quota of the rationing flow. The delay flow gives the user "permission" to smoke and trains the user gradually lengthen the time until gratification. For example, the first time the user selects the delaying flow button 760c in a day, the countdown timer 778 may start at 30 seconds. The second time the user selects the delaying flow button 760c, the countdown timer 778 may start at 1 minute. The interface 774 can present acknowledgement messages such as "it's ok to smoke" and "give yourself some time between a craving and lighting up, we will help you extend the space between craving and smoking over time." In some implementations, the countdown timer 778 can continue to run after reaching 0 seconds and until the user begins to smoke to determine a length of time that the user was able to resist smoking.

FIG. 11B illustrates the example interface 776 that is presented to the user when the countdown timer 778 reaches 0. The interface 776 can present the user with empowerment messages such as showing the longest the user waiting to engage in the undesired behavior and showing motivations for quitting.

Figure 12:
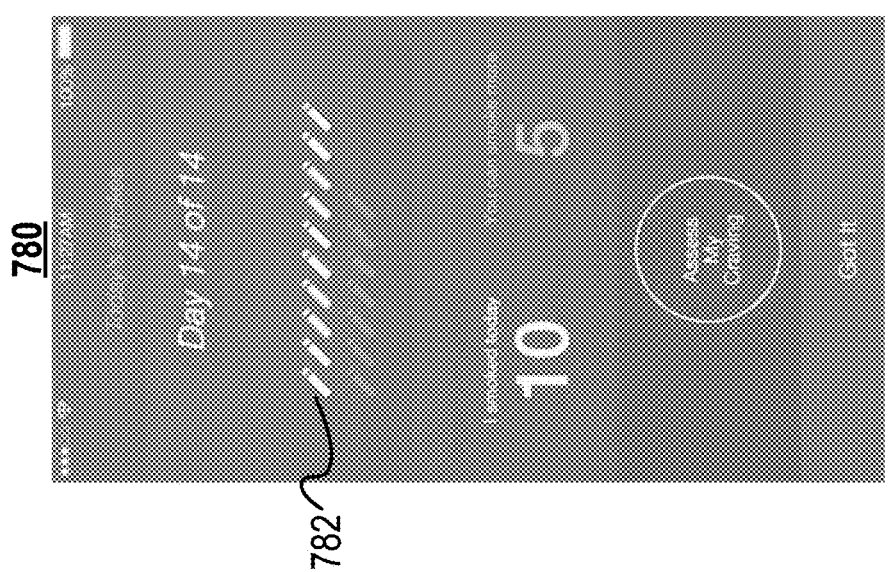

FIG. 12 illustrates an example interface 780 that is presented to the user when the user selects the rationing flow button 760 in interface 758. The interface 780 can include a quota 782 of times the user is allowed to engage in the undesired behaviors for a predetermined time period. For example, the interface 780 illustrates that the quota includes 15 cigarettes. The user has already consumed 10 cigarettes and 5 additional cigarettes remain in the quota. As described above, when the user smokes a cigarette through via the delay flow, the smoked cigarette can be deducted from the rationing quota 782. In some implementations, the application also enables the user to input additional cigarettes that were smoked independently of the user's use of the application. For example, the user may report to the check-in manager 720 that the user smoked two cigarettes that were not in response to a rationing flow or a delaying flow. The quota 782 can be a form of an acknowledgment message. The interface 780 can also include a connect message that indicates was a percentage of the quota remained unused.

Once the emergency flow is completed by the user, the application interfacing with the behavioral change platform 120 can present a notification to the user requesting an indication of whether the emergency flow was successful in helping mitigate the user's emergency. If the user did not overcome the emergency the user can be represented with the emergency button, such that the user may immediately enter a new emergency workflow.

Figure 13:
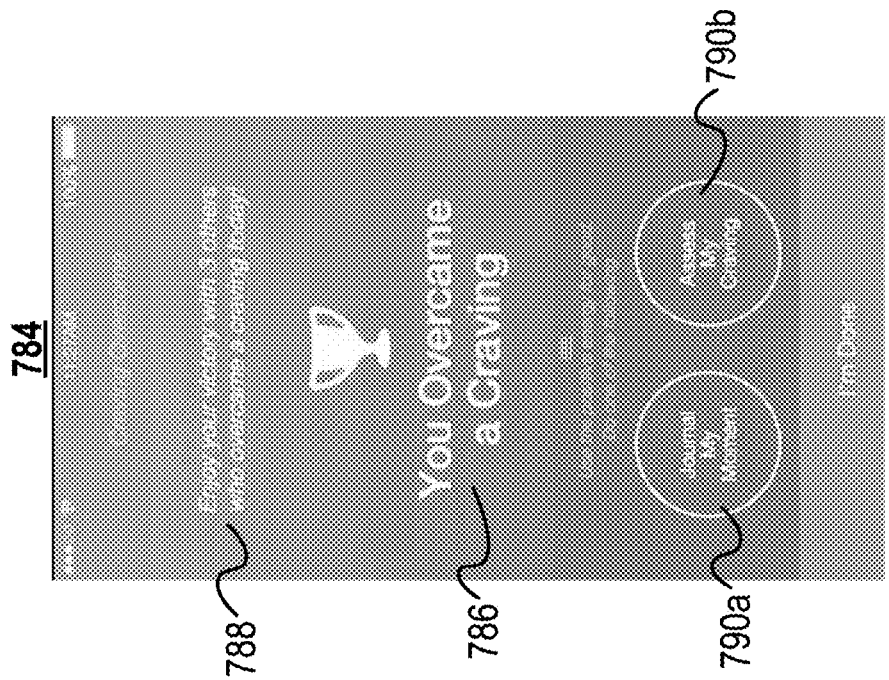

FIG. 13 illustrates an example interface 784 that can be presented to the user at the completion of a workflow that mitigated an emergency. The interface 784 can include an acknowledge message 786 stating "you overcame a craving." In some implementations, the interface 784 can include interface buttons with connecting messages that enable the user to share their completion with the user's supports. The interface 784 can also include a connect message 788 that indicates the number of times the user has overcome an emergency in a given day. The interface 784 also includes two reacting messages in the form of reaction buttons 790a and 790b. The first react button 790a takes the user to a "quit journal" where the user can make comments on the process of quitting and overcoming the present emergency. The second react button 790b takes the user to an assessment interface where the user can memorialize the processes of quitting. In some implementations, the assessment interface enables the use to provide their physical, physiological, and emotional state to the behavioral change platform 120, which may also be used at least implementations of the method 742 to predict the best emergency flow for the method 742 or to predict when the emergency flow should be presented to the user.

Figure 14:
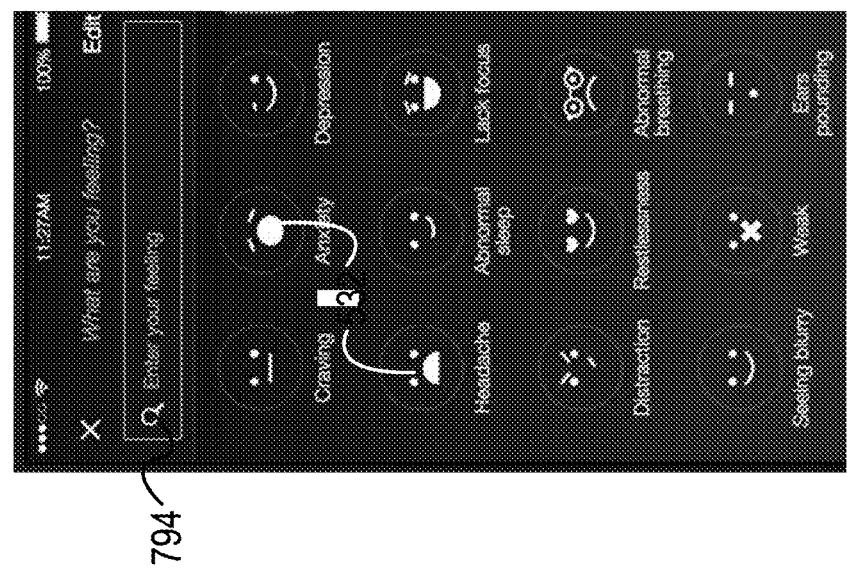

FIG. 14 illustrates an example assessment interface 792. The assessment interface 792 can enable the user to report and deal with their sentiments generated during each cessation emergency. In some implementations, dealing with the users' sentiments after a behavioral endpoint has been achieved is important for preventing relapse or regression to the undesirable set of behaviors. The interface 792 can include an input box 794 where the user can select the physiological or psychological adjective that best describes their experience in the moment. The interface 792 can also include a number of quick input buttons 796 that are each associated with common states the user might have experienced. The states can include, but are not limited to, cravings and other impulses, anxiety, depression, headache, abnormal sleeping, lack of focus, distracted, restless, abnormal breathing, blurred vision, weak, and pounding ears.

Referring again to FIG. 5, the method 742 can also include updating the user database when the user completes an emergency flow (BLOCK 750). The user's profile in the user database of the behavioral change platform 120 can be updated to include which mission and emergency flow was completed. Other data such as whether the user was successful in avoiding the undesirable behavior, a time the cessation emergency occurred, and a location where the cessation emergency occurred. As described above, the behavioral change platform 120 can predict what type of and when the emergency flow should be presented to the user. Updating the user's profile with the data gathering during the presentation of each emergency flow, enables the behavioral change platform 120 to adapt to the user's quit journey. For example, a machine learning algorithm can be used to analyze the data from each emergency flow presentation to enable the selection of the emergency flow that is most likely to mitigate the user's emergency or to best select a time that the emergency button should be presented to the user.

It should be appreciated that the dynamic content delivery and presentation management platform 820 is similar to the behavioral change platform 120 described with respect to FIG. 4

While the invention has been particularly shown and described with reference to specific embodiments, it should be understood by those skilled in the art that various changes in form and detail may be made therein without departing from the spirit and scope of the invention described in this disclosure.

While this specification contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method, comprising:
    identifying, by a server including one or more processors, a profile associated with an application executing on a remote computing device;
    determining, by the server, using the profile, a first set of routines, each routine of the first set of routines specifying a first action to be performed via the application executing on the remote computing device;
    transmitting, by the server, a first request for application activity update, the first request including instructions to provide a first trigger on the remote computing device, the remote computing device configured to provide one or more actions to be performed via the remote computing device responsive to detecting an activation of the first trigger;
    receiving, by the server, from the remote computing device and responsive to the activation of the first trigger on the remote computing device, a response including relating to at least one action for one of the first set of routines performed via the remote computing application;
    determining, by the server, using the profile, the response, and the first set of routines, a second set of routines to include into a second request for application activity update, each of the second set of routines specifying a second action to be performed via the remote computing device; and
    transmitting, by the server, the second request for application activity update, the second request including instructions to provide a second trigger on the remote computing device to perform at least one of the second set of routines.

2. The method of claim 1, further comprising generating, by the server, a response prediction model for selecting routines specifying actions to be performed via the remote computing device to include in requests for application activity updates, and
    wherein determining the first set of routines further comprises applying the response prediction model to the profile to determine the first set of routines, and
    wherein determining the second set of routines further comprises applying the response prediction model to the profile, the response, and the first set of routines to determine the second set of routines.

3. The method of claim 1, further comprising generating, by the server, a probability of performing at least one action for one of the second set of routines via the remote computing devices based on the profile, the response, and the first set of routines; and
    wherein determining the second set of routines further comprises determining the second set of routines based on the determined probability of performing at least one action.

4. The method of claim 1, wherein determining the first set of routines further comprises selecting the first set of routines in accordance with a behavioral change policy to perform via the remote computing device; and
    wherein determining the second set of routines further comprises selecting the second set of routines in accordance with the behavioral change policy, the behavior change policy specifying selection of the second set of routines subsequent to the response to the first set of routines.

5. The method of claim 1, wherein determining the second set of routines further comprises:
    identifying a first routine type corresponding to the first set of routines; and
    selecting a second routine type corresponding to the second set of routines based on the profile, the response, and the first routine type of the first set of routines.

6. The method of claim 1, wherein transmitting the first request further comprises transmitting the first request including the instructions to provide a first set of triggers on the remote computing device, each trigger of the first set indicating one or more subsequent triggers to be provided in response to an activation of the trigger.

7. The method of claim 1, wherein receiving the response further comprises receiving the response including content generated by the remote computing device responsive in accordance with the activation of the first trigger, the content relating to the at least one action for one of the first set of routines performed via the remote computing application.

8. The method of claim 1, further comprising:
    receiving, by the server from the remote computing device, a request to provide routines to be performed via the remote computing device, the request identifying a condition;
    determining, by the server, based on the condition identified in the response, a third set of routines to include into a third request for application activity update, each of the third set of routines specifying a third action to be performed via the remote computing device; and
    transmitting, by the server, the third request for application activity update, the third request including instructions to provide a third trigger on the remote computing device to perform at least one of the third set of routines.

9. The method of claim 1, further comprising updating, by the server, responsive to receiving the response, the profile using the response relating to at least one action for one of the first set of routines performed via the application.

10. The method of claim 1, further comprising logging, by the server, onto an activity log for the remote computing device, content of the response received responsive to the activation of the first trigger on the remote computing device and a timestamp corresponding to when the response was received.

11. A system, comprising:
    at least one server having one or more processors, configured to:
        identify a profile associated with an application executing on a remote computing device;
        determine, using the profile, a first set of routines, each routine of the first set of routines specifying a first action to be performed via the application executing on the remote computing device;

transmit a first request for application activity update, the first request including instructions to provide a first trigger on the remote computing device, the remote computing device configured to provide one or more actions to be performed via the remote computing device responsive to detecting an activation of the first trigger;

receive, from the remote computing device and responsive to the activation of the first trigger on the remote computing device, a response including relating to at least one action for one of the first set of routines performed via the remote computing application;

determine, using the profile, the response, and the first set of routines, a second set of routines to include into a second request for application activity update, each of the second set of routines specifying a second action to be performed via the remote computing device; and transmit the second request for application activity update, the second request including instructions to provide a second trigger on the remote computing device to perform at least one of the second set of routines.

12. The system of claim 11, wherein the at least one server is further configured to generate a response prediction model for selecting routines specifying actions to be performed via the remote computing device to include in requests for application activity updates;

apply the response prediction model to the profile to determine the first set of routines; and apply the response prediction model to the profile, the response, and the first set of routines to determine the second set of routines.

13. The system of claim 11, wherein the at least one server is further configured to generate a probability of performing at least one action for one of the second set of routines via the remote computing devices based on the profile, the response, and the first set of routines; and determine the second set of routines based on the determined probability of performing at least one action.

14. The system of claim 11, wherein the at least one server is further configured to select the first set of routines in accordance with a behavioral change policy to perform via the remote computing device; and select the second set of routines in accordance with the behavioral change policy, the behavior change policy specifying selection of the second set of routines subsequent to the response to the first set of routines.

15. The system of claim 11, wherein the at least one server is further configured to determining the second set of routines by:

identifying a first routine type corresponding to the first set of routines; and selecting a second routine type corresponding to the second set of routines based on the profile, the response, and the first routine type of the first set of routines.

16. The system of claim 11, wherein the at least one server is further configured to transmit the first request including the instructions to provide a first set of triggers on the remote computing device, each trigger of the first set indicating one or more subsequent triggers to be provided in response to an activation of the trigger.

17. The system of claim 11, wherein the at least one server is further configured to receive the response including content generated by the remote computing device responsive in accordance with the activation of the first trigger, the content relating to the at least one action for one of the first set of routines performed via the remote computing application.

18. The system of claim 11, wherein the at least one server is further configured to receive, from the remote computing device, a request to provide routines to be performed via the remote computing device, the request identifying a condition;

determine, based on the condition identified in the response, a third set of routines to include into a third request for application activity update, each of the third set of routines specifying a third action to be performed via the remote computing device; and transmit the third request for application activity update, the third request including instructions to provide a third trigger on the remote computing device to perform at least one of the third set of routines.

19. The system of claim 11, wherein the at least one server is further configured to update, responsive to receiving the response, the profile using the response relating to at least one action for one of the first set of routines performed via the application.

20. The system of claim 11, wherein the at least one server is further configured to log, onto an activity log for the remote computing device, content of the response received responsive to the activation of the first trigger on the remote computing device and a timestamp corresponding to when the response was received.

* * * * *